United States Patent
Srivastava et al.

(10) Patent No.: US 9,694,319 B2
(45) Date of Patent: Jul. 4, 2017

(54) GAS PURIFIER

(71) Applicant: Entegris, Inc., Billerica, MA (US)

(72) Inventors: Abneesh Srivastava, Amherst, NY (US); Thomas Richard Gaffney, Carlsbad, CA (US); Joshua T. Cook, Encinitas, CA (US); Peter K. Shogren, Chula Vista, CA (US); Daimhin Paul Murphy, San Diego, CA (US); Stenio da Costa Pereira, San Diego, CA (US)

(73) Assignee: Entegris, Inc., Billerica, MA (US)

( * ) Notice: Subject to any disclaimer, the term of this patent is extended or adjusted under 35 U.S.C. 154(b) by 365 days.

(21) Appl. No.: 14/377,656

(22) PCT Filed: Feb. 8, 2013

(86) PCT No.: PCT/US2013/025239
§ 371 (c)(1),
(2) Date: Aug. 8, 2014

(87) PCT Pub. No.: WO2013/119883
PCT Pub. Date: Aug. 15, 2013

(65) Prior Publication Data
US 2015/0056113 A1    Feb. 26, 2015

Related U.S. Application Data

(60) Provisional application No. 61/597,230, filed on Feb. 10, 2012.

(51) Int. Cl.
*B01D 53/86* (2006.01)
*C01B 21/04* (2006.01)
(Continued)

(52) U.S. Cl.
CPC ........... *B01D 53/869* (2013.01); *B01D 53/28* (2013.01); *B01D 53/75* (2013.01);
(Continued)

(58) Field of Classification Search
None
See application file for complete search history.

(56) References Cited

U.S. PATENT DOCUMENTS 3,497,069 A    2/1970    Lindenthal et al.
3,969,481 A    7/1976    Murray et al.
(Continued)

FOREIGN PATENT DOCUMENTS

CN    1094378 A    11/1994
CN    202212103    5/2012
(Continued)

OTHER PUBLICATIONS

Equilibrium and Mass Transfer Zones: How to Optimize Molecular Sieves Bed Size, 1 pg. (Feb. 2009).
(Continued)

*Primary Examiner* — Walter D Griffin
*Assistant Examiner* — Jelitza Perez
(74) *Attorney, Agent, or Firm* — Entegris, Inc. Legal Dept.

(57) ABSTRACT

The invention relates to a gas purifier that removes moisture and oxygen from inert gases and reducing gases, for example, at sub-atmospheric pressures. The purifier can remove part per million levels of moisture in a gas stream to less than 100 parts per trillion by volume, and has a low pressure drop and a sharp breakthrough curve.

20 Claims, 12 Drawing Sheets

(51) Int. Cl.

| | | |
|---|---|---|
| *C01B 3/56* | (2006.01) | |
| *C01B 3/58* | (2006.01) | |
| *C01B 23/00* | (2006.01) | |
| *B01D 53/28* | (2006.01) | |
| *B01D 53/75* | (2006.01) | |
| *B01J 29/14* | (2006.01) | |
| *B01D 53/26* | (2006.01) | |

(52) U.S. Cl.
CPC ........ *B01D 53/8671* (2013.01); *B01J 29/143* (2013.01); *C01B 3/56* (2013.01); *C01B 3/58* (2013.01); *C01B 21/0422* (2013.01); *C01B 23/0026* (2013.01); *B01D 53/261* (2013.01); *B01D 2253/108* (2013.01); *B01D 2255/20753* (2013.01); *B01D 2255/50* (2013.01); *B01D 2256/10* (2013.01); *B01D 2257/104* (2013.01); *B01D 2257/80* (2013.01); *C01B 2203/042* (2013.01); *C01B 2203/0435* (2013.01); *C01B 2203/0465* (2013.01); *C01B 2203/0495* (2013.01); *C01B 2203/146* (2013.01); *C01B 2210/0031* (2013.01); *C01B 2210/0034* (2013.01); *C01B 2210/0042* (2013.01); *C01B 2210/0045* (2013.01); *C01B 2210/0062* (2013.01)

(56) References Cited

U.S. PATENT DOCUMENTS

| | | | |
|---|---|---|---|
| 4,135,896 | A | 1/1979 | Parish et al. |
| 4,216,198 | A | 8/1980 | Simons |
| 4,306,894 | A | 12/1981 | Fukami et al. |
| 4,713,224 | A | 12/1987 | Tamhankar et al. |
| 4,964,888 | A | 10/1990 | Miller |
| 5,470,555 | A | 11/1995 | Shimada et al. |
| 5,492,682 | A | 2/1996 | Succi et al. |
| 5,728,198 | A | 3/1998 | Acharya et al. |
| 5,769,928 | A | 6/1998 | Leavitt |
| 5,902,561 | A | 5/1999 | Carrea et al. |
| 6,398,838 | B1* | 6/2002 | Kaffenberger ........ B01D 29/111 55/498 |
| 7,918,923 | B2 | 4/2011 | Applegarth et al. |
| 2003/0200866 | A1* | 10/2003 | Weyrich ............. B01D 53/0407 95/129 |
| 2005/0005771 | A1 | 1/2005 | Lomax et al. |
| 2007/0034193 | A1 | 2/2007 | King |

FOREIGN PATENT DOCUMENTS

| | | |
|---|---|---|
| EP | 1 297 881 A1 | 4/2003 |
| JP | 59-107910 | 6/1984 |
| WO | WO 99/34896 A1 | 7/1999 |
| WO | WO 01/10548 A1 | 2/2001 |

OTHER PUBLICATIONS

International Preliminary Report on Patentability, issued in International Application PCT/US2013/057025, entitled "Apparatus for Preventing Microparticle and Dust Migration in Layered Bed Purification Devices," Date of Completion of Report: Dec. 16, 2014.
International Search Report and Written Opinion, issued in International Application PCT/US2013/057025, entitled "Apparatus for Preventing Microparticle and Dust Migration in Layered Bed Purification Devices," Date of Search: Feb. 18, 2014.
Li, "Oxygen Productions Techniques", Metallurgical Industry Press, pp. 92-93 (Jul. 31, 2001).
Meng, "Design of Modern Pressurized Container," Huazhong University of Science & Technology Press, p. 95 (1987) (cited in Search Report for CN2013800189924).
Second Written Opinion of the International Preliminary Examining Authority (PCT Rule 66), issued in International Application PCT/US2013/057025, entitled "Apparatus for Preventing Microparticle and Dust Migration in Layered Bed Purification Devices," Date of Mailing: Sep. 16, 2014.
Srivastava, A., et al., "Sub-Atmospheric Gas Purification for EUVL Vacuum Environment Control", 2012 SPIE Extreme Ultraviolet (EUV) Lithography III Conference.
Written Opinion and Search Report for Singapore Patent Application No. 11201404783S, "Gas Purifier", date of mailing: May 4, 2016.
Written Opinion and Search Report for Singapore Patent Application No. 11201501158P "Apparatus for Preventing Microparticle and Dust Migration in Layered Bed Purification Devices", date of mailing: Jan. 19, 2016.
International Preliminary Report on Patentability for International Application No. PCT/US2013/025239 "Gas Purifier"; date of completion: May 16, 2014.
International Search Report for International Application No. PCT/US2013/025239 "Gas Purifier"; date of mailing: May 17, 2013.
Kakutani, Y. et al., "Inhibition of Contamination of Ru-Capped Multilayer Mirrors for Extremem Ultraviolet Lithography Projection Optics by Ethanol," *Japanese Journal of Applied Physics*, 46(9B):6155-6160 (Sep. 2007).
Matsunari, S., et al., "Lifetime Estimation and Improvement of Capping Layer on Multi-Layer Mirror for EUV Lithography in EUVA," *2005 International Symposium on Extremem Ultraviolet Lithography*, pp. 1-17 (2005).
Meiling, H., et al., "The EUV Program at ASML: an update", *Proceedings of SPIE*, vol. 5037: 24-34 (2003).
"SEMI F68-1101 Test Method for Determining Purifier Efficiency," (Semiconductor Equipment and Materials International/www.semi.org), pp. 1-9 (Nov. 2001).
Wedowski, M., et al., "Lifetime Studies of Mo/Si and Mo/Be Multilayer Coatings for Extremem Ultraviolet Lithography," *SPIE*, vol. 3767, pp. 217-224 (Jul. 1999).
Wise, R.L., et al., "An Investigation of Moisture and Oxygen Contamination in a Vacuum Loadlock Single-Wafer Cluster Tool", *Semiconductor Manufacturing Conference Proceedings, 1997 IEEE International Symposium*, pp. E1-E4 (Oct. 6, 1997).
Written Opinion of the International Searching Authority for International Application No. PCT/US2013/025239 "Gas Purifier"; date of mailing: May 17, 2013.

* cited by examiner

GAS PURIFIER

RELATED APPLICATION

This application is the U.S. National Stage of International Application No. PCT/US2013/025239, filed Feb. 8, 2013, which designates the U.S., published in English, and claims the benefit of U.S. Provisional Application No. 61/597,230, filed on Feb. 10, 2012. The entire teachings of the above applications are incorporated herein by reference.

BACKGROUND OF THE INVENTION

Tamhankar discloses in U.S. Pat. No. 4,713,224 a one-step process for purifying an inert gas by contacting the inert gas including minute quantities of an impurity selected from the group consisting of CO, $CO_2$, $O_2$, $H_2$, $H_2O$ and mixtures thereof with a particulate material comprised of nickel in an amount of at least about 5% by weight as elemental nickel distributed over an effective area of surface, typically from about 100 to 200 $m^2$/g, thereby forming an inert gas having less than 1 ppm and preferably less than 0.1 ppm of any such impurity.

Carrea discloses in U.S. Pat. No. 5,902,561 a two-stage method for removal of impurities such as carbon monoxide, carbon dioxide, oxygen, water, hydrogen, and methane from inert gases at ambient temperature (0° C. to 60° C.). In the first stage, the inert gas is contacted with a nickel catalyst, and in the second stage the inert gas is passed over a getter alloy. Purified gas exiting the second stage of the purifier contains less than one part per billion (ppb) levels of the impurities. The nickel catalyst and getter alloy are initially activated at elevated temperature. The catalyst and getter may be reactivated by heating and purging, and hydrogen previously removed from the impure gas can be used in the reactivation process. Carrea also discloses a purifier with 3 zones where the first zone is particulate nickel, the second purifier zone is a molecular sieve, and the third zone is a getter material.

Shimada in U.S. Pat. No. 5,470,555 discloses a process for purification of organometallic compounds containing impurities by bringing the compound into contact with a catalyst comprising a copper or nickel component as the essential ingredient to remove oxygen contained in an organometallic compound. According to Shimada, the process is capable removal of oxygen in an organometallic compound to as low as 0.1 ppm and further to an ultra-low concentration of 0.01 ppm. Shimada also discloses that it is possible to combine the process of removing oxygen using a catalyst with a process of removing moisture by the use of a synthetic zeolite, etc. according to the demand.

Tako in JP Pub. No. 59-107910 discloses obtaining argon by purification while reducing the cost of operation and the load of maintenance and control by bringing argon into contact with 4A type molecular sieves at a specified temperature and with a metallic getter at a specified temperature, and by further bringing the argon into contact with 5A type molecular sieves under a specified pressure. For example, argon is passed through 4A or 5A type molecular sieves at room temperature or greater than 0° C. to remove chiefly $H_2O$ or $CO_2$, and it is passed through a column packed with metallic copper or nickel heated to 150-300° C. to remove $H_2$ or CO. The argon is further passed through 5A type molecular sieves under 5-25 atm pressure.

SUMMARY OF THE INVENTION

Versions of the invention include a gas purifier comprising a purifier bed contained in a housing that removes moisture and oxygen from an inert gas and from a reducing gas. The purifier bed comprises a first bed of material comprising macropore mass transfer limited molecular sieves that remove moisture from the inert gas and the reducing gas, the molecular sieves having a largest dimension of less than 0.7 millimeters±20 percent; and a second bed of material comprising a metal catalyst on a support that removes oxygen from the inert gas and the reducing gas, the metal catalyst being at least partially regenerated to a reduced form by the reducing gas at room temperature.

In some versions of the invention, the gas purifier is characterized by a moisture concentration at the fluid outlet of 5 parts per billion by volume ($ppb_{v/v}$) or less in a hydrogen gas flow of 2 standard liters per minute (slpm) at a pressure of 200 torr after flowing nitrogen gas containing between 1 $ppb_{v/v}$ and 20 $ppb_{v/v}$ oxygen and between 1 $ppb_{v/v}$ and 20 $ppb_{v/v}$ moisture at a pressure of 200 torr and a gas flow of 2 slpm for 6 hours through the gas purifier.

In some versions of the invention, the molecular sieves are alkali metal zeolite X molecular sieves and, more particularly, 13× molecular sieves. In some versions of the invention, the alkali metal zeolite X molecular sieves are 13× molecular sieves that have a particle size of 0.7 millimeters±20 percent. In yet other versions of the invention, the molecular sieves are alkali metal exchanged zeolites, alkaline earth exchanged zeolites or lanthanide exchanged zeolites.

In some versions of the invention, the first bed of material is 30 percent by volume to 70 percent by volume of the purifier bed, and the second bed of material is 70 percent by volume to 30 percent by volume of the purifier bed. In a particular version of the invention, the first bed of material is 50±5 percent by volume of the purifier bed, and the second bed of material is 50±5 percent by volume of the purifier bed. Alternatively, the first bed of material is 30 percent by volume to 40 percent by volume of the purifier bed, and the second bed of material is 70 percent by volume to 60 percent by volume of the purifier bed.

In some versions of the invention, the gas purifier is further characterized by a moisture concentration at the fluid outlet of 100 parts per trillion moisture by volume or less after 4000 minutes, after flowing an inert gas containing 12 parts per million moisture by volume at a flow rate of 10 standard liters per minute through the purifier.

In some versions of the invention, the metal catalyst contains nickel.

In some versions of the invention, the first bed of material is downstream of the second bed of material.

In some versions of the invention, the purifier bed removes moisture and oxygen from the inert gas and the reducing gas at sub-atmospheric pressure. Alternatively, the purifier bed removes moisture and oxygen from the inert gas and the reducing gas at atmospheric pressure.

In some versions of the invention, the gas purifier further comprises a media-retaining porous membrane separating the first bed of material and the second bed of material, wherein the media-retaining membrane is secured within the housing at its edges by an expandable ring comprising an inner circumference, an outer circumference and a locking mechanism for expanding and retaining the ring by radial force against an inner wall of the housing when the locking mechanism is engaged. Specifically, the media-retaining porous membrane can be a gas-permeable membrane having a pore size to prevent particles of purification media from passing therethrough.

In some versions of a gas purifier comprising a media-retaining porous membrane, the media-retaining porous membrane is in intimate and retaining contact with a first bed of purification media.

In some versions of a gas purifier comprising a media-retaining porous membrane, the media-retaining porous membrane is fixed between a surface of the expandable ring and a surface of a downstream bed of purification media.

In some versions of a gas purifier comprising a media-retaining porous membrane, the media-retaining porous membrane comprises a material that is metallic, semi-metallic, carbon based, ceramic, polymeric, or thermally conductive.

In some versions of a gas purifier comprising a media-retaining porous membrane, the media-retaining porous membrane is a felt, a wire mesh, sintered particles, electro-blown fibers, woven membrane, or non-woven membrane.

In some versions of a gas purifier comprising a media-retaining porous membrane, the locking mechanism is spring-locking mechanism.

In some versions of a gas purifier comprising a media-retaining porous membrane, the expandable ring is secured by radial force between the outer diameter of the expandable ring and the inner wall of the housing.

In some versions of a gas purifier comprising a media-retaining porous membrane, the expandable ring comprises metal (e.g., stainless steel), plastic, or metal alloy.

In some versions of a gas purifier comprising a media-retaining porous membrane, the expandable ring has a thickness of from about 0.06 inches to about 0.12 inches.

In some versions of a gas purifier comprising a media-retaining porous membrane, the media-retaining porous membrane has a pore size of from about 0.05 microns to about 1.0 microns.

In some versions of the invention, in use, the gas purifier is oriented vertically or horizontally.

The gas purifiers described herein can further comprise one or more additional beds of material and optionally one or more additional media-retaining porous membranes, wherein the additional membrane, if present, separates any two beds of material.

Another version of the invention is a gas purifier media consisting essentially of a bed of alkali metal zeolite X molecular sieves having a particle size of 0.7 millimeters±20 percent; and a bed of a nickel catalyst on a support that removes oxygen from an inert gas, wherein the bed of the molecular sieves is 30 percent by volume to 70 percent by volume of the purifier media and the bed of nickel catalyst on a support is 70 percent by volume to 30 percent by volume of the purifier media. More particularly, the bed of the molecular sieves is 30 percent by volume to 40 percent by volume of the purifier media and the bed of nickel catalyst on a support is 70 percent by volume to 60 percent by volume of the purifier media. The alkali metal zeolite X molecular sieves can be 13× molecular sieves.

Another version of the invention is a method of purging a chamber, comprising purging the chamber and, optionally, one or more gas supply lines with an inert gas purified with a gas purifier described herein for a first period of time; and purging the chamber and, optionally, one or more gas supply lines with a reducing gas purified with the gas purifier described herein for a second period of time. In some versions, the purification of the inert and/or the reducing gas occurs at sub-atmospheric pressure.

The purifier medias described herein possess smaller particles sizes compared to other purification medias, such as carbon. It is believed that the small particle size contributes to the media's ability to achieve higher purity of the exiting gas, as well as higher purity stability, compared to other purification medias. For example, the purifier medias described herein can achieve an outlet purity of $N_2$ gas containing less than 50 ppt water and less than 1 ppt hydrocarbons (C5 and higher), and an outlet purity of $H_2$ gas containing less than 100 ppt water, less than 100 ppt carbon dioxide and less than 400 ppt oxygen. The purifier described in some versions of the invention can be used to remove moisture to less that 50 parts per trillion by volume (50 $ppt_{v/v}$) from gases like hydrogen, nitrogen, and noble gases and other similar gases and mixtures of these gases that may be used, for example, in semiconductor applications in EUV lithography, atomic layer deposition, and chamber purging. Due to the purity levels of inert gases and reducing gases achieved using the present invention, as well as the purity stability and dynamic range of the purifiers described herein, the purifiers described herein can be used in extreme ultra-violet lithography (EUVL), plasma etch and other vacuum-based applications.

BRIEF DESCRIPTION OF THE DRAWINGS

The foregoing will be apparent from the following more particular description of example embodiments of the invention, as illustrated in the accompanying drawings.

DETAILED DESCRIPTION OF THE INVENTION

Figure 1:
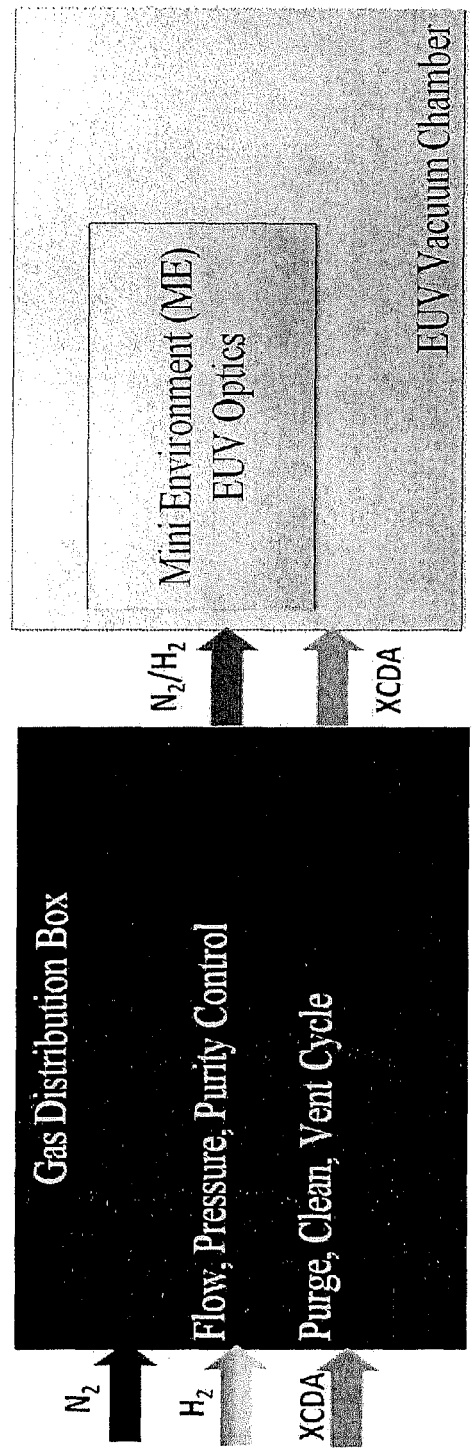
FIG. 1 is a block diagram of a gas distribution box, an extreme ultraviolet (EUV) mini-environment and an EUV vacuum chamber.

While various compositions and methods are described, it is to be understood that this invention is not limited to the particular molecules, compositions, designs, methodologies or protocols described, as these may vary. It is also to be understood that the terminology used in the description is for the purpose of describing the particular versions or embodiments only, and is not intended to limit the scope of the present invention which will be limited only by the appended claims.

It must also be noted that as used herein and in the appended claims, the singular forms "a", "an", and "the" include plural reference unless the context clearly dictates otherwise. Thus, for example, reference to a "pore" is a reference to one or more pores and equivalents thereof known to those skilled in the art, and so forth. Unless defined otherwise, all technical and scientific terms used herein have the same meanings as commonly understood by one of ordinary skill in the art. Methods and materials similar or equivalent to those described herein can be used in the practice or testing of embodiments of the present invention. All publications mentioned herein are incorporated by reference in their entirety. Nothing herein is to be construed as an admission that the invention is not entitled to antedate such disclosure by virtue of prior invention. "Optional" or "optionally" means that the subsequently described event or circumstance may or may not occur, and that the description includes instances where the event occurs and instances where it does not. All numeric values herein can be modified by the term "about," whether or not explicitly indicated. The term "about" generally refers to a range of numbers that one of skill in the art would consider equivalent to the recited value (i.e., having the same function or result). In some embodiments the term "about" refers to ±10% of the stated value, in other embodiments the term "about" refers to 12% of the stated value. While compositions and methods are described in terms of "comprising" various components or steps (interpreted as meaning "including, but not limited to"), the compositions and methods can also "consist essentially of" or "consist of" the various components and steps, such terminology should be interpreted as defining essentially closed or closed member groups.

Although the invention has been shown and described with respect to one or more implementations, equivalent alterations and modifications will occur to others skilled in the art based upon a reading and understanding of this specification. In addition, while a particular feature or aspect of the invention may have been disclosed with respect to only one of several implementations, such feature or aspect may be combined with one or more other features or aspects of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising." Also, the term to "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated herein.

Gas purification is used in many industrial and medical applications. For example, semiconductor manufacturing uses gases that are often purified to contain less that 1 part per billion by volume ($ppb_{v/v}$ or ppbv) amounts of contaminants like water, oxygen, and hydrocarbons. Gas purifiers can contain adsorptive materials, chemisorptive materials or a combination of these. In some applications, where multiple purified gases are used, for example, where gas is switched between an inert gas, such as nitrogen gas, and a reducing gas, like hydrogen gas, it is desirable, for cost reduction and space constraints, to be able to use a single purifier for both gases. Some oxygen-removing purifier materials can release water when exposed to a reducing gas like hydrogen gas; some adsorptive materials can release adsorbed contaminants at low pressures. Low pressures are used in a variety of applications, for example load locks and vacuum chambers, to minimize and or reduce contamination on surfaces like wafers and chamber walls.

The problem of using a single gas purifier composition to remove oxygen and moisture from an inert gas and also from a reducing gas at sub-atmospheric pressures is solved by a gas purifier, comprising a housing having a fluid inlet and a fluid outlet, the inlet and outlet fluidly connected through a purifier bed contained in the housing that removes moisture and oxygen from an inert gas and from a reducing gas. The purifier bed comprises a first bed of material comprising macropore mass transfer limited molecular sieves that remove moisture from the inert gas and the reducing gas, the molecular sieves having a largest dimension of less than 0.7 millimeters±20 percent; and a second bed of material comprising a metal catalyst on a support that removes oxygen from the inert gas and the reducing gas, the metal catalyst being partially or completely regenerable by the reducing gas at room temperature. The bed of the molecular sieves is 30 percent by volume to 70 percent by volume of the purifier bed and the bed of metal catalyst on a support is 70 percent by volume to 30 percent by volume of the purifier bed and the metal catalyst bed is located at the inlet of the purifier. More particularly, the bed of the molecular sieves is 40 percent by volume to 60 percent by volume of the purifier bed and the bed of metal catalyst on a support is 60 percent by volume to 40 percent by volume of the purifier bed and the metal catalyst bed is located at the inlet of the purifier. Alternatively, the bed of molecular sieves is 50±5 percent by volume of the purifier bed, and the metal catalyst bed is 50±5 percent by volume of the purifier bed.

The purifiers in some versions of the invention can be characterized in that a flow of $N_2$ gas (containing 1 $ppb_{v/v}$ to 10 $ppb_{v/v}$ oxygen and 1 $ppb_{v/v}$ to 20 $ppb_{v/v}$ moisture) through the purifier for 6 hours at a pressure of 200 torr and a flow of 2 standard liters per minute (slpm) when switched to hydrogen gas (containing 1 ppb to 10 $ppb_{v/v}$ oxygen and 1 $ppb_{v/v}$ to 20 $ppb_{v/v}$ moisture) at 200 torr and a flow of 2 slpm results in a moisture concentration from the purifier outlet after switching to the hydrogen gas of less than 10 parts per billion by volume after about 6 hours; in some cases, less than 5 part per billion by volume moisture after 6 hours of hydrogen gas flow; and in still other versions, 1 part per billion by volume moisture or less after 6 hours of hydrogen gas flow.

The purifiers in other versions of the invention can be characterized in that a flow of $N_2$ gas (containing 1 $ppb_{v/v}$ to 10 $ppb_{v/v}$ oxygen and 1 $ppb_{v/v}$ to 20 $ppb_{v/v}$ moisture) through the purifier for 6 hours at a pressure of less than 100 torr and a flow of 2 slpm when switched to hydrogen gas (containing 1 ppb to10 $ppb_{v/v}$ oxygen and 1 $ppb_{v/v}$ to 20 $ppb_{v/v}$ moisture) at less than 100 torr and a flow of 2 slpm results in a moisture concentration from the purifier outlet after switching to the hydrogen gas of less than 10 parts per billion by volume after about 6 hours; in some cases, less than 5 part per billion by volume moisture after 6 hours of hydrogen gas flow; and in still other versions, 1 part per billion by volume moisture or less after 6 hours of hydrogen gas flow. The purifier can be used at atmospheric pressures (760 torr and higher) or sub-atmospheric pressures (for example, but not limited to, between 100 torr and less than 760 torr; in some cases, between 200 torr and 600 torr; in some cases, 100 torr or less).

There is also a continuing need to remove impurities from gases to lower levels (produce higher purity gases) by using purifiers that contain a combination of a catalyst bed and an adsorption bed. There is a need to remove impurities from gases to levels below 1 part per billion by volume using these purifiers without increasing costs and purifier size due to larger catalyst and adsorption beds, and there is a continuing need to achieve this purity level without increasing the pressure drop of the purifier. Versions of the invention can also be used for the removal of moisture and oxygen from gases like hydrogen, nitrogen, and noble gases, like argon, by a purifier that has a bed of nickel on a high surface area support followed by a bed of alkali metal exchanged zeolite X molecular sieves that have a size that ranges from 2.2 millimeters to 0.5 millimeters.

Figure 6:
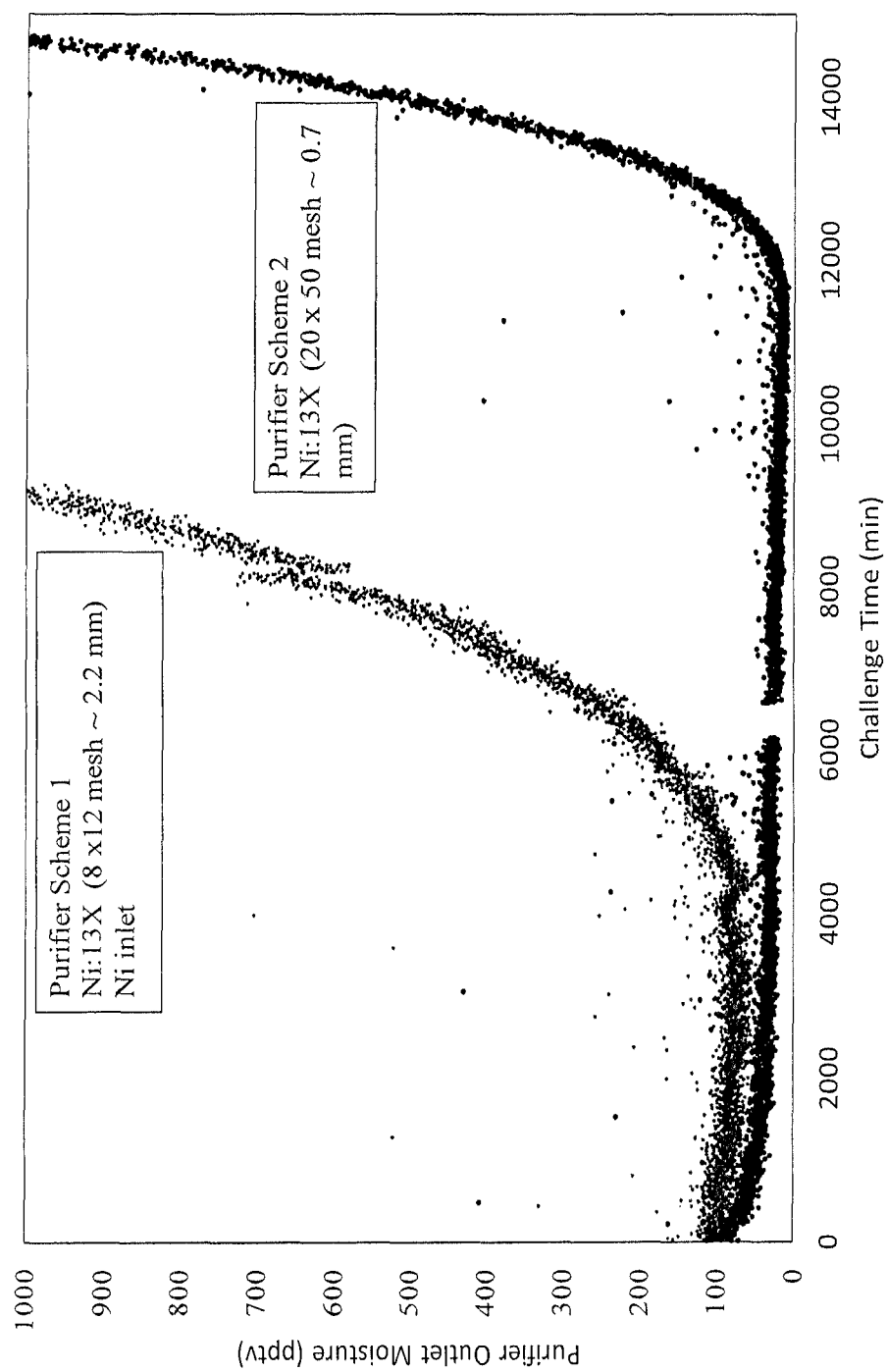
FIG. 6 is a graph of outlet moisture levels as a function of challenge time, and illustrates the breakthrough curves for purifier C (Scheme 2 composition described herein) and a second purifier (Scheme 1 composition, described herein).

Advantages of the invention are illustrated by a version of the invention that is a purifier that contains the Scheme 2 composition in FIG. 6 and Example 2. This purifier and composition can be used to achieve an outlet purity for a gas that contains a moisture impurity, such that the gas at the purifier outlet has a moisture concentration that can be below 50 parts per trillion by volume and with lower scatter compared to the average moisture at the purifier outlet from a gas treated by a purifier that contains the Scheme 1 composition. From about 2000 minutes to 4000 minutes for the Scheme 1 purifier, the purifier is challenged with 12 parts per million moisture by volume in a gas and the outlet from the purifier of Scheme 1 contains about 80 parts per trillion by volume moisture and the deviation is about 40 parts per trillion by volume. From about 8000 minutes to 11500 minutes for the Scheme 2 purifier, the purifier is also challenged with 12 parts per million by volume in a gas and the outlet from the purifier of Scheme 2 contains about 25 parts per trillion by volume or less moisture and the deviation is about 20 parts per trillion by volume to about 25 parts per trillion by volume or less.

Versions of the invention include a purifier that comprises a housing that has an inlet and an outlet that are fluidly connected through the metal catalyst bed and molecular sieve bed contained in the housing. The housing may include one or more frits or filter elements at the inlet and outlet that help to contain the bed materials in the housing. The inlet of the housing is used to fluidly connect the purifier to a source of an inert gas that is to be purified and the housing outlet can be used to provide fluid connection to a process for receiving the purified gas. In one version of the invention, the purifier includes, consists essentially of or consists of a bed of material comprising alkali metal exchanged zeolite X molecular sieves that have a particle size of 2.2 millimeters, or less, and a bed of material that comprises nickel metal on a high surface area support. The bed of molecular sieves and the bed of material that comprises nickel metal purify the gas at a temperature of from 15° C. to 35° C. The beds of the purifier can be housed in a standard KF70 housing with frits (housing available from Entegris, Inc.), or other similar housing, and the purifier with the metal catalyst and molecular sieves with a bead size of less than 2.2 millimeters has a differential pressure drop of within ±30% of a similar purifier with 2.2 millimeter bead size molecular sieves. The purifier in versions of the invention can be characterized by purifying an impure gas inlet to the purifier that contains 12 parts per million moisture by volume, for example, water in nitrogen gas, at a flow rate of 10 standard liters per minute, and provides a purified gas outlet from the purifier that contains 100 parts per trillion moisture by volume or less, in some versions, 50 parts per trillion moisture by volume or less. In some embodiments of the invention, the purified gas outlet from the purifier contains between 10 parts per trillion moisture by volume and 30 parts per trillion moisture by volume.

One version of the invention is a method of purging a chamber (wafer carrier, glove box, reactor, vacuum chamber, mini environment, and the like) that includes the acts or steps of purging the chamber and optionally one or more gas supply lines with an inert gas for a first period of time, the inert gas purified with a gas purifier in versions of the invention disclosed herein that removes moisture and oxygen from an inert gas and a reducing gas, and purging the chamber and, optionally, one or more supply lines for a second period of time with a reducing gas that is also purified with the same purifier used to purify the inert gas. The method may further include additional acts or steps of switching the inert gas and reducing gas through the purifier for various periods of time. The purification of the inert and or reducing gas may occur at sub-atmospheric pressure. In some versions of the invention, the sub-atmospheric pressure is 100 torr or less; in other versions of the invention, the sub-atmospheric pressure can be from 200 torr to 600 torr; in yet other versions of the invention, the sub-atmospheric pressure can be 100 torr to less than 760 torr. The purified gas outlet from the purifier contains less than 5 parts per billion moisture by volume at these sub-atmospheric pressures and 2 standard liter per minute (slpm) gas flow.

One version of the invention is an inert gas purifier media that comprises, consists of, or consists essentially of a bed of alkali metal exchanged zeolite X molecular sieves, and a bed of a nickel catalyst on a support that is capable of removing oxygen from the inert gas. The alkali metal exchanged zeolite molecular sieves have a particle size of between 0.7 (±20%) millimeters and less than 2.2 millimeters. The bed of molecular sieves is 30 percent by volume to 70 percent by volume of the purifier media and the bed of metal catalyst on a support is 70 percent by volume to 30 percent by volume of the purifier media. In a particular version of the invention, the bed of molecular sieves is 50±5 percent by volume of the purifier bed, and the bed of metal catalyst on a support is 50±5 percent by volume of the purifier bed. Alternatively, the bed of molecular sieves is 30 percent by volume to 40 percent by volume of the purifier bed, and the bed of metal catalyst on a support is 70 percent by volume to 60 percent by volume of the purifier bed.

The ratio, if defined as Ni to desiccant molecular sieve ratio, can be used to compensate for a relatively poor desiccant (by dropping the ratio) or a relatively poor oxygen scavenger (by increasing the ratio). The purifier media can be characterized by purifying an inert gas inlet to a housing that contains the purifier media where the inert gas contains 12 parts per million moisture by volume (water), the inert gas flows through the purifier at a flow rate of 10 standard liters per minute, the inert gas outlet from the purifier media contained in the housing contains less than 30 parts per trillion moisture by volume and where the breakthrough curve of the purifier media to moisture is characterized by an increase in the outlet moisture concentration of 5 times the average baseline outlet concentration from the purifier media in a time of $1.3 \times 10^3$ minutes or less. The purifier media in the housing can be characterized with the metal catalyst near the inlet of the housing and the molecular sieves near the outlet of the housing.

One version of the invention is a purifier that includes a housing that has a fluid inlet and a fluid outlet, the fluid inlet and fluid outlet fluidly connected through a purifier bed contained in the housing. The purifier bed removes oxygen and moisture from an inert gas and from a reducing gas, like hydrogen gas, the purifier comprises a bed of material comprising alkali metal zeolite X molecular sieves that have a particle size of 2.2 millimeters, or less. The purifier bed further comprises a bed of material that is a metal catalyst on a support, the metal catalyst on the support capable of removing oxygen from the inert gas. The bed of the molecular sieves can be between 30 percent by volume and 70 percent by volume of the purifier bed and the bed of metal catalyst on a support can be between 70 percent by volume and 30 percent by volume of the purifier bed and the metal catalyst bed is located at the inlet of the purifier. In a particular version of the invention, the bed of molecular sieves is 50±5 percent by volume of the purifier bed, and the bed of metal catalyst on a support is 50±5 percent by volume of the purifier bed. Alternatively, the bed of molecular sieves is 30 percent by volume to 40 percent by volume of the purifier bed, and the bed of metal catalyst on a support is 70 percent by volume to 60 percent by volume of the purifier bed.

The purifier in this version of the invention can be further characterized by purifying an inert gas inlet to the purifier where the inert gas contains 12 parts per million moisture by volume (water), the inert gas flows through the purifier at a flow rate of 10 standard liters per minute, the inert gas outlet from the purifier contains 80 parts per trillion moisture by volume or less. The purifier is further characterized in that the inert gas outlet from the purifier has a peak distribution that is 80 parts per trillion by volume (pptv) moisture, or less, and that has a FWHM (full width half maximum) of 50 parts per trillion by volume, or less, of moisture.

In one version of the purifier, the purifier comprises or consists of 50 parts by volume (±20%) of a metal catalyst bed and 50 parts by volume (±20%) of a 13× molecular sieve bed where the molecular sieves have a particle size (largest aspect) of 2.2 millimeters, or less, to a particle size (largest aspect) of 0.7 (±20%) millimeters, and the purifier is characterized by having a differential pressure drop in a KF70 housing from Entegris, Inc., as detailed in Table 2 (see Example 2) of:

0.12 (±20%) pounds per square inch at an inlet pressure of 15 pounds per square inch and a flow rate of 1 standard liter per minute of nitrogen;

0.074 (±20%) pounds per square inch at an inlet pressure of 30 pounds per square inch and a flow rate of 1 standard liter per minute of nitrogen;

0.035 (±20%) pounds per square inch at an inlet pressure of 60 pounds per square inch and a flow rate of 1 standard liter per minute of nitrogen;

0.02 (±20%) pounds per square inch at an inlet pressure of 90 pounds per square inch and a flow rate of 1 standard liter per minute of nitrogen;

0.34 (±20%) pounds per square inch at an inlet pressure of 15 pounds per square inch and a flow rate of 3 standard liter per minute of nitrogen;

0.24 (±20%) pounds per square inch at an inlet pressure of 30 pounds per square inch and a flow rate of 3 standard liter per minute of nitrogen;

0.13 (±20%) pounds per square inch at an inlet pressure of 60 pounds per square inch and a flow rate of 3 standard liter per minute of nitrogen;

0.09 (±20%) pounds per square inch at an inlet pressure of 90 pounds per square inch and a flow rate of 3 standard liter per minute of nitrogen;

1.3 (±20%) pounds per square inch at an inlet pressure of 15 pounds per square inch and a flow rate of 10 standard liter per minute of nitrogen;

0.88 (±20%) pounds per square inch at an inlet pressure of 30 pounds per square inch and a flow rate of 10 standard liter per minute of nitrogen;

0.51 (±20%) pounds per square inch at an inlet pressure of 60 pounds per square inch and a flow rate of 10 standard liter per minute of nitrogen; or 0.35 (±20%) pounds per square inch at an inlet pressure of 90 pounds per square inch and a flow rate of 10 standard liter per minute of nitrogen.

In versions of the invention, the desiccant that removes moisture from the gas at sub-atmospheric pressures can be a bed of molecular sieves. In some versions of the invention, the molecular sieves are characterized by a mass transfer rate of water or moisture (gas) into a formed (beaded, extrudate) adsorbent pellet that is macropore limited; for macropore limited materials, the mass transfer rate of contaminant into the molecular sieve adsorbent pellet increases inversely to the square of the pellet radius as described by $(D_{eff}/R^2)$; i.e., increases 4× in mass transfer rate if the diameter is 2× smaller, A faster adsorbent (larger $D_{eff}/R^2$) allows for a large moisture intrapellet diffusion and an earlier approach to equilibrium conditions. In some versions of the invention, the molecular sieves are zeolite X whose water adsorption rates are macropore limited and, therefore, the mass transfer rate varies inversely with the square of the pellet size. In other versions of the invention, the molecular sieves are alkali metal exchanged zeolites, alkaline earth exchanged zeolites or lanthanide exchanged zeolites. The pellet size can be characterized as a diameter for spherical desiccant beads, by the diameter of a cylinder for cylindrical shaped desiccants, or by an equivalent size based on a mesh size from sieving.

In versions of the invention and methods of using it, the molecular sieves are alkali metal exchanged zeolites, alkaline earth exchanged zeolites or lanthanide exchanged zeolites. In some versions of the inventive purifier, the molecular sieves can have a particle bead size of between 0.5 millimeters and 2.2 millimeters, or less; in other versions of the purifier, the molecular sieves can have a particle bead size of between 0.5 millimeters and less than 2.2 millimeters; in still other versions of the purifier, the molecular sieves can have a particle bead size of 0.7 millimeters (±20%).

In versions of the invention and methods of using it, an alkali metal exchanged zeolite X is used as a dessicant. In some versions of the inventive purifier, the alkali metal exchanged zeolite X can have a particle bead size of between 0.5 millimeters and 2.2 millimeters, or less; in other versions of the purifier, the alkali metal exchanged zeolite X is a 13× molecular sieve that can have a particle bead size of between 0.5 millimeters and less than 2.2 millimeters; in still other versions of the purifier, the 13× molecular sieve can have a particle bead size of 0.7 millimeters (±20%).

In versions of the purifier, the size of the molecular sieve particles can be chosen such that 95 percent, or more, in some cases 99%, or more, have a largest dimension that is in the range of from 0.5 millimeters to 2.2 millimeters. In other versions of the purifier, the molecular sieve particles can be chosen such that 95 percent, or more, in some cases 99%, or more, have a largest dimension of between 0.7 (±20%) millimeters and 2.2 millimeters. In still other versions of the purifier, the size of the molecular sieves can be chosen such that 95 percent, or more, in some cases 99%, or more, have a largest dimension of 0.7 millimeters (±20%). The size of the molecular sieve bead can refer to the average aspect or dimension of the zeolite particle for non-spherical particles.

The volume of desiccant and the volume of metal catalyst in the purifier in versions of the invention can be chosen such that the moisture concentration outlet from the purifier under a flow of $N_2$ gas (containing 1 $ppb_{v/v}$ to 10 $ppb_{v/v}$ oxygen and 1 $ppb_{v/v}$ to 20 $ppb_{v/v}$ moisture) is through the purifier for 6 hours at a pressure of 100 torr or less, in some versions, a pressure of 200 torr and a flow of 2 slpm, when switched to hydrogen gas containing 1 $ppb_{v/v}$ to 10 $ppb_{v/v}$ oxygen and 1 $ppb_{v/v}$ to 20 $ppb_{v/v}$ moisture at a pressure of 100 torr or less, in some versions, a pressure of 200 torr and a flow of 2 slpm, is less than 10 parts per billion by volume after about 6 hours; in some versions of the invention, less than 5 parts per billion by volume moisture; and in still other versions of the invention, 1 part per billion by volume moisture or less after 6 hours of hydrogen gas flow.

In versions of the invention and methods of using it, the bed of the molecular sieve is 30 percent by volume to 70 percent by volume of the purifier media and the bed of metal catalyst on a support is 70 percent by volume to 30 percent by volume of the purifier media. In other versions of the invention and methods of using it, the bed of the molecular sieve is 40 percent by volume to 60 percent by volume of the purifier media and the bed of metal catalyst on a support is 60 percent by volume to 40 percent by volume of the purifier media. The ratio, if defined as oxygen removing metal catalyst volume to desiccant molecular sieve volume ratio, can be used to compensate or adjust for a relatively poor desiccant (drop the ratio) or a relatively poor oxygen scavenger (increase the ratio). In still other versions of the inventive purifier and methods of using it, the bed is 50 (±10%) parts by volume nickel metal on a high surface area support and 50 (±10%) parts by volume of molecular sieve.

In some versions of the invention, the metal catalyst bed is nearest the purifier inlet portion of the housing (may include a frit) and the molecular sieve bed is located at the outlet end portion of the housing (may include a particle filter or fit at the outlet portion of the housing).

High surface area supports for the metal catalyst can include powders such as diatomaceous earth, alumina, silica-alumina, aluminosilicate, calcium silicate, and the like. The support may have some adsorption capacity for water but the capacity of the support is less than the capacity of the molecular sieve adsorbant bed material for moisture.

The metal catalyst can comprise or consist of metal on the high surface area support. Examples of metal catalysts used in a version of the invention can include nickel or hydrogen reduced forms of nickel and/or nickel oxide, and combinations of these. The metal catalyst primarily removes oxygen from the impure gas although it may also remove lesser amounts of impurities like moisture. The metal catalyst can be partially or completely regenerated to its initial state by treatment at room temperature with a reducing gas like hydrogen.

The purge gas used in versions of the invention, may contain oxygen and/or water, and can be an inert gas, such as, but not limited to, nitrogen, argon, helium and other noble gases. The purge gas may also be a reducing gas, like hydrogen, or a mixture of a reducing gas and an inert gas, for example, 5% $H_2$ in $N_2$. The inert gas can flow through the purifier at sub-atmospheric pressure for a period of time and then be switched to a flow at sub-atmospheric pressure of a reducing gas through the same purifier (a "dual gas purifier") for a period of time. The inert gas and reducing gas may be switched back and forth during the application.

A "dual gas purifier" refers to a purifier in versions of the invention that can be used under sub-atmospheric pressure conditions with a flow of an inert gas to remove oxygen and moisture contaminants from the inert gas and produce a purified inert gas and the purifier can also be used under sub-atmospheric pressure conditions with a flow of a reducing gas to remove oxygen and moisture contaminants from the reducing gas to produce a purified reducing gas.

A version of the invention is a method of purifying an inert gas using a purifier as described above that comprises or consists of a metal catalyst on a support and 13× molecular sieves that have a bead size of 2.2 millimeters, or less, for example as small as about 0.5 millimeters. In some versions of the method, the impurity in the inert gas can be moisture at a concentration of 1 parts per million by volume to 20 parts per million by volume. The method comprises the acts or the steps of: flowing a process gas that contains an impurity that comprises moisture, oxygen, or combination including these through the purifier, the purifier has an inlet fluidly connected to a source of the impurity containing inert gas, the bed of molecular sieves and the bed of material that comprises a metal catalyst are at a temperature in the range of from 15° C. to 35° C.; and removing the impurity from the gas and flowing the purified gas through the purifier housing outlet. In some versions of the invention, the purifier beds are housed in a KF70 housing with frits and or a metal filter element (available from Entegris, Inc.). In some versions, the purified inert gas outlet from the purifier contains 100 parts per trillion moisture by volume or less; in some embodiments of the invention, the purified inert gas outlet from the purifier contains between 10 parts per trillion moisture by volume and 30 parts per trillion moisture by volume.

Figure 2:
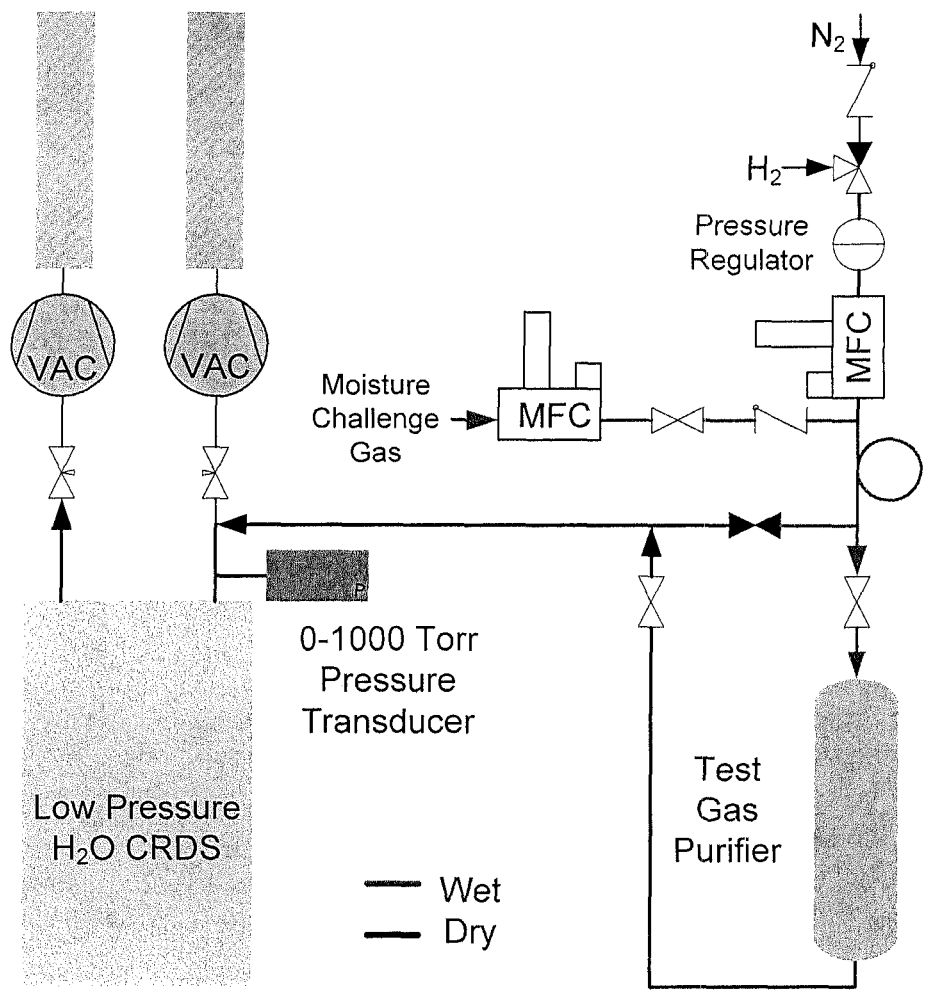
FIG. 2 is a schematic representation of an experimental setup for sub-atmospheric gas purifier evaluation.
Figure 3:
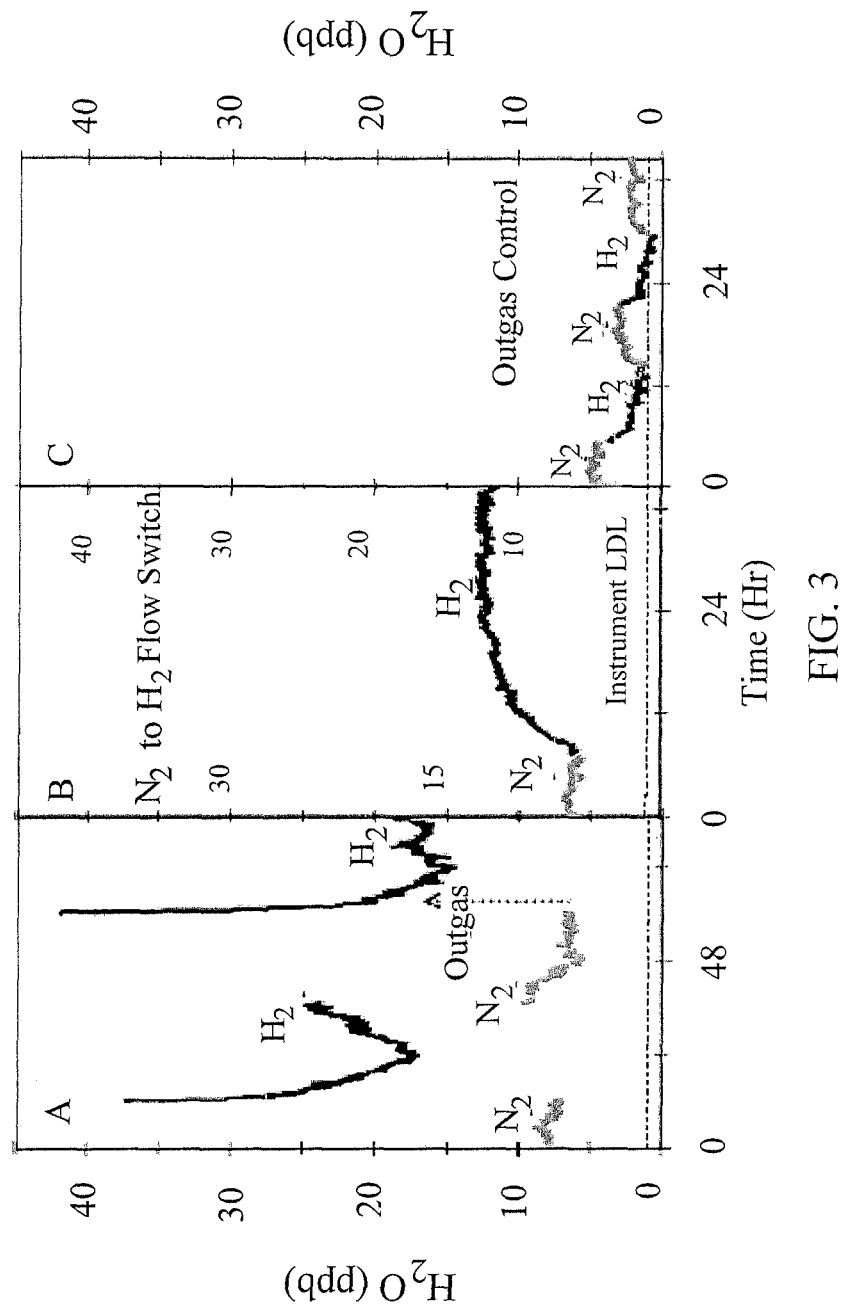
FIG. 3 is a graph of moisture level as a function of purifier pressure, and shows moisture outgassing under sub-atmospheric conditions for three purifier technologies: A (a commercial purifier used for nitrogen and hydrogen purification to remove oxygen and moisture), B (a "H" purifier, available from Entegris, Inc., Bedford, Mass. that contains a metal catalyst that can be reduced in hydrogen and removes oxygen, and a desiccant to remove moisture), and C (purifier of Scheme 2 as described in Example 2 below that includes a metal catalyst on a support and a molecular sieve desiccant).

A test to characterize the purifier in versions of the invention includes using the setup illustrated in FIG. 2 of Example 1, challenging the purifier with $N_2$ gas containing 1 $ppb_{v/v}$ to 10 $ppb_{v/v}$ oxygen and 1 $ppb_{v/v}$ to 20 $ppb_{v/v}$ moisture for 6 hours at a sub-atmospheric pressure of 200 torr, as measured by the pressure transducer at the CRDS, and at a gas flow rate of 2 standard liters per minute, measured by the mass flow controller; switching the nitrogen flow to a flow of hydrogen gas containing 1 $ppb_{v/v}$ to 10 $ppb_{v/v}$ $O_2$ and 1 $ppb_{v/v}$ to 20 $ppb_{v/v}$ moisture at a sub-atmospheric pressure of 200 torr and flow rate of 2 standard liters per minute (slpm); and measuring the moisture concentration outlet from the purifier at sub-atmospheric pressure after switching to the hydrogen gas flow. The moisture concentration in the purified gas outlet from the purifier at the sub-atmospheric pressure as measured by the CRDS after switching to the hydrogen gas purge flow is less than 10 parts per billion by volume after about 6 hours. In some versions of the invention, the moisture concentration outlet from the purifier is less than 5 parts per billion by volume. In still other versions of the invention, the moisture outlet from the purifier is 1 part per billion by volume or less (see purifier C in FIGS. 3 and 4 and FIG. 6). For example, purifier C (Scheme 2 composition in Example 2) in a version of the invention is characterized in FIG. 3 at 200 torr and gas flow of 2 slpm. As shown in FIG. 3, the moisture concentration outlet from purifier C on switching from nitrogen gas to hydrogen gas is less than 5 $ppb_{v/v}$ and in some cases is about 1 $ppb_{v/v}$ or less (see results for purifier C at about 24 hours). It is expected that a purifier containing a zeolite X with the 2.2 millimeter size and metal catalyst on a support in another version of the invention, for instance the purifier of Scheme 1 in Example 2, would also provide a purified gas with a concentration of moisture of less than 12 $ppb_{v/v}$ at 200 torr and 2 slpm flow. FIG. 3 illustrates that at 200 torr and 2 slpm gas flow, the moisture on switching to hydrogen gas from nitrogen gas is greater than about 15 $ppb_{v/v}$ for purifier A and greater than 5 $ppb_{v/v}$ for purifier B.

In versions of the inventive purifier and method of using it, the breakthrough curve of the inventive purifier for a gas with a moisture impurity can be characterized by an increase in the outlet moisture concentration of 5 times the average baseline outlet concentration for the previous 1000 minutes of operation prior to breakthrough, the increase in the outlet moisture concentration at breakthrough to 5 times the average baseline concentration of the impurity outlet from the purifier occurs in a time of $1.3 \times 10^3$ min or less at a flow rate of 10 standard liters per minute of the gas with the moisture impurity.

In versions of the invention, the gas purifier further comprises a media-retaining porous membrane separating the first bed of material and the second bed of material, wherein the media-retaining membrane is secured within the housing at its edges by an expandable ring comprising an inner circumference, an outer circumference and a locking mechanism for expanding and retaining the ring by radial force against an inner wall of the housing when the locking mechanism is engaged. Specifically, the media-retaining porous membrane can be a gas-permeable membrane having a pore size to prevent particles of purification media from passing therethrough.

Figure 11:
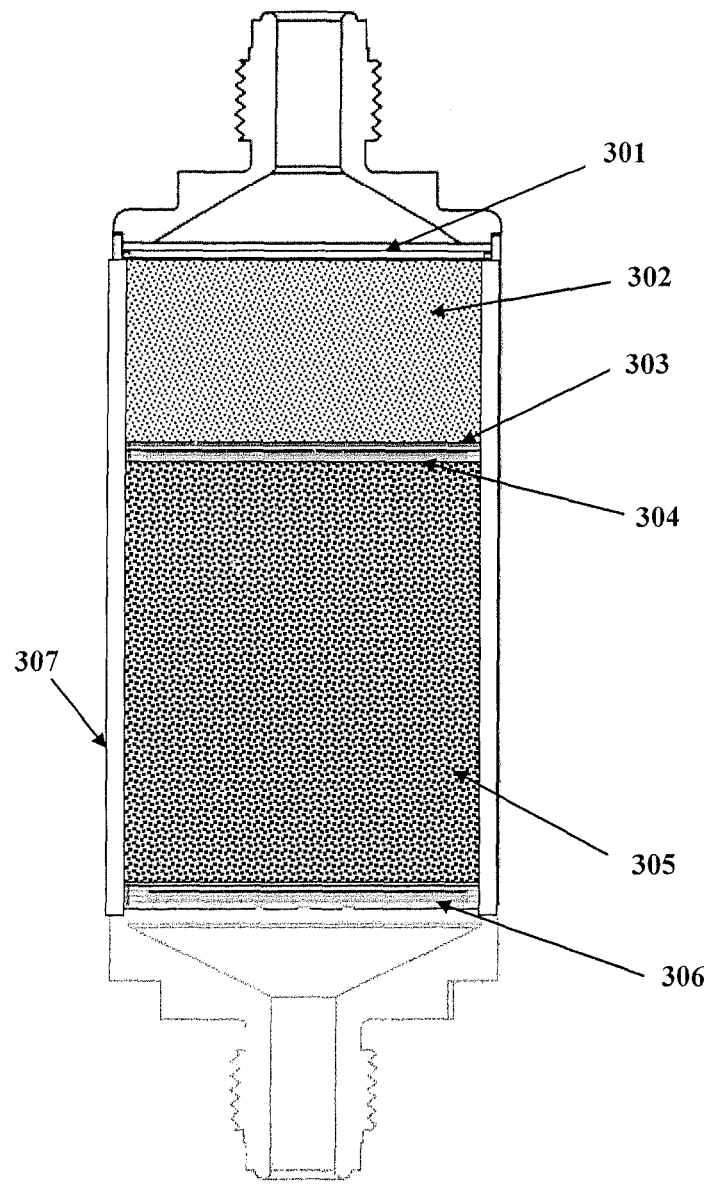
FIG. 11 illustrates a non-limiting version of the purifier invention that includes a housing with gas inlet (top) and gas outlet (bottom), an upstream frit near the inlet, an upstream purification media separated from a downstream purification media by a membrane that is held securely in contact with a top surface of the downstream media, the downstream media overlies a particle filter or frit near the outlet of the housing. The top media layer (fine dots) is shown being separated from a bottom media layer (coarse dots) by a membrane or separator and a ring. Alternately, the membrane could be secured by being brazed at its edges to the housing and the ring eliminated.

An illustration of a purifier including a media-retaining porous membrane is illustrated in FIG. 11. The purifier includes a housing 307 that can be fit with an inlet and an outlet. The purifier comprises an upstream fit 301 near the fluid inlet, a bed of upstream purification media 302 (e.g., metal catalyst on a support), a bed of downstream purification media 305 (e.g., molecular sieves) and a downstream fit 306 near the fluid outlet. Further, membrane 304 separates purification beds 302 and 305 from each other, preventing fines or particles of media from migrating into the adjacent bed. Membrane 304 overlies the downstream media, and its edges are in contact with 305 and are secured in place by retaining ring 303, which is held in place in housing 307 by radial force. Notably the housing 307 does not include a groove in the side wall for an expandable media-retaining ring or snap ring to hold the membrane or other mesh. As shown in FIG. 11, the expandable ring 303 is an annular ring that provides a radial force against the housing and holds the porous membrane in place against the downstream purification media. Because the expandable ring is held in place in the housing by exerting radial force against the inner wall of the housing, this feature provides a great advantage in that no additional and costly tooling is necessary to create a groove along the inner wall of the housing. This further provides the advantage of the expandable media-retaining ring being usable in existing gas purifier devices.

A porous membrane, which can also be referred to as a separator in versions of the invention is placed between one or more layers of the purification media. The membrane is porous and can be metallic, semi-metallic, carbon based or ceramic; it may also be a thermally conductive material or a polymeric material. A thermally conductive membrane can advantageously improve the thermal distribution in a purifier, which increases the amount of contaminants desorbed during activation, thereby increasing the lifetime of the purifier. The membrane can be in the form of a felt, a wire mesh, sintered particles, extruded, cast, or electro-blown polymeric material. In one version of the invention, the porous membrane is stainless steel felt.

The membrane or separator has two substantially opposing surfaces and an edge. An entire surface, or substantially the entire surface, of one face of the membrane contacts the top surface of one purification media layer. An outer region of the membrane is secured to the inside perimeter of the housing by friction or bonding. A membrane can be positioned between each media layer in the purifier; in some versions, a membrane is positioned between each media layer; in other versions, a membrane is positioned between layers where media migration can occur, but may be absent between other media layers.

The membrane is secured uniformly at its edges so that any gas with upstream media particles is forced to flow through the membrane; there are no gaps at the edges for particles to bypass the membrane, and any media particles, fines, or dust are retained by the membrane. In some versions of the invention, the membrane is secured through the use of an expandable media-retaining ring.

An expandable media-retaining ring means an expandable ring with a locking mechanism optionally affixed to a media-retaining gas-permeable membrane. In some versions of the invention, the expandable media-retaining ring includes a media-retaining gas-permeable membrane, and in other versions of the invention, the expandable media-retaining ring refers to just the expandable ring with locking mechanism. In some versions of the invention, the expandable media-retaining ring is alternately referred to as a snap ring, or a retaining ring herein.

One way to secure the membrane uniformly at its edges is by using an expandable media-retaining ring, alternatively a snap ring or retaining ring, overtop of the membrane which overlies the downstream media. In other versions, the separator or membrane could be welded or brazed to the inner housing surface. Alternatively, the separator or membrane may be press fit into the housing. Preferably, the edges of the membrane are secured or fixed, for example, by a snap ring that sandwiches the membrane between the downstream media and a bottom snap ring surface. In some embodiments, the membrane is secured or fixed into the housing by a brazed or welded seal between edges of the membrane and housing.

In one version of the invention, the membrane is secured by an expandable media-retaining ring, or snap ring, that has an inner diameter and an outer diameter and a locking mechanism to retain it within the housing. Preferably, the locking mechanism is a spring-locking mechanism. The retaining ring is placed in the housing with the locking mechanism disengaged so that the ring can be positioned in the housing. When the ring is positioned, it is pressed against and touches one surface of the membrane (the opposite surface of the membrane touches the top surface of the downstream purifier media), the locking mechanism is secured and contacts the outer diameter of the retaining ring against the inner housing wall. The retaining ring is secured against the inner wall of the housing by tension or radial force. In some versions of the invention, the retaining ring has a thickness of between 0.06 inches and 0.12 inches. This thickness range provides a ring with sufficient strength to withstand pressure changes during use of the purifier and regeneration of the purifier and maintains contact of the membrane with the downstream media. The retaining ring, taken together with the membrane, is not compressible, or at the very least, is minimally compressible. This is an important operational feature, because a compressible retaining ring and membrane would cause a disadvantageous increase in pressure drop.

In versions of the invention, the material for one or more layers, preferably the downstream layer, is tamped down, vibrated or otherwise compacted in a housing to reduce voids in the media layer. A membrane cut to a size of an inner cross sectional area of the housing, for example a size which allow the membrane to be brazed to the housing wall, a size that allows it to be press fit, or a size that allows the membrane to be secured in place by a retaining ring against the media, is placed on the housing and atop the media. The membrane is then secured within the housing. In some embodiments of the invention, the membrane is secured within the housing by a retaining ring, held in the housing by radial force.

The porous membrane has a pore size that retains particles from any purification media it is in contact with. The particles which are retained may be actual media beads or extrudates, fines and dust, or smaller particles (micron and submicron media particles). The membrane secured in the housing does not impede gas flow through the purifier housing and more than the purification media bed layer or internal filter of the purifier. Small or larger pore sized membrane could be chosen depending upon the media and its propensity to form dust and other fines (micron sized particles). In some versions of the invention, the pore size of the membrane can be 0.05 microns to 1 micron; in other versions of the invention, the pore size of the membrane can be 0.1 microns. In other versions of the invention, the pore size of the membrane can be less than 10 microns, preferably from about 2 to about 5 microns. In some versions of the invention, the porous membrane can be a microporous membrane. The pore size of the membrane can be determined by aerosol retention test or retention test using salt particles and the like.

Advantages of versions of the present invention include that there is no need for a groove in the housing which reduces costs and makes it possible to "pack" the membrane to conform to actual volume of purification media that is present in the housing which prevents channeling of the media and allows the purifier to be used in a vertical orientation, a horizontal orientation, or any other orientation. Securing the edges of the membrane prevents media migration and improves purifier performance. It is unexpected that substantially reducing or eliminating gas flow at the edges of a membrane by fixing the edge of the membrane would lead to such an improvement in purifier impurity removal and stability.

Example 1

EUV lithography (EUVL) at 13.5 nanometers presents a new demand on gas purifiers, including the removal of contaminants like moisture and hydrocarbons from gases such as hydrogen and nitrogen gases, and to deliver purified gas flow under sub-atmospheric pressure. EUVL imaging takes place in unbaked vacuum chambers. Consequently, the dominant residual gas in EUV lithography tools is water vapor. Moisture and hydrocarbon contamination in the EUV vacuum environment can result in irradiation-induced degradation of multilayer optics operational lifetime.

Contamination levels need to be strictly controlled in the EUVL tool environment to maintain optics lifetime. Per one requirement (Meiling, H., et al., "*The EUV Program at ASML: An update,*" Proc. SPIE 5037, 24-35 (2003), incorporated herein by reference in its entirety), EUV chamber levels of $C_xH_y \leq 1E-09$ mbar, $H_2O \leq 1E-07$ mbar is required. In turn, purity levels of parts-per-billion by volume (ppbv) and parts-per-trillion by volume (pptv) are being targeted for gases introduced under vacuum into the EUVL chamber. Scanner systems can employ a gas distribution box, illustrated in FIG. 1, to control conditions like flow, pressure and purity of gases ($N_2$, $H_2$ and extra clean dry air (XCDA)) supplied to the mini-environment (ME) and EUV vacuum chamber for cleaning, purging exposure optics and providing dynamic gas lock. Gas conditioning in a vacuum environment utilizes gas distribution elements, including gas purifiers, that do not outgas under reduced pressure. Gas purifiers can employ adsorption chemistry to selectively remove (adsorb) oxygen and carbon containing contaminant species from the carrier gas flow. Under vacuum gas flow conditions, potential adsorbate release can raise the partial pressure of moisture and hydrocarbon background in the EUV vacuum chamber. This can possibly prolong EUVL tool pump down periods (idle time), further exacerbating efforts to improve overall process throughput.

In this example, the moisture removal performance of a purifier that removes contaminants such as oxygen and water from both nitrogen and hydrogen gas, a dual gas ($N_2$ and $H_2$) purifier, under sub-atmospheric pressure conditions is presented. The dual gas purifier, as compared to other commercially available purifiers, also provides reduced outgassing of moisture after hydrogen gas flow through the purifier. The dual gas purifier could be used to reduce moisture release to EUV chamber from a gas distribution box.

The test in this example models the gas supply to a purifier in an EUV system including nitrogen and hydrogen gas switch states, adopted in the ME. The results of the test compare moisture outgassing from a gas purifier in a version of the invention (Purifier C) with two commercially available gas purifiers (Purifiers A and B), typically used in the gas distribution box. To maintain different gas supply states during cleaning and purging in an EUV system, nitrogen and hydrogen gas often need to flow through the same gas distribution path. A single purifier that is compatible and purifies both $N_2$ and $H_2$ gases can be used in this application.

Experimental data is also presented for Purifier C, which has the composition of Scheme 2 in Example 2, to demonstrate no occurrence of moisture outgassing under repeated switching from $N_2$ gas to $H_2$ gas near 10 kPa pressure as well as less than 1 ppb outlet purity in both gases.

A reduced pressure cavity ringdown spectrometer (CRDS, Tiger Optics) was used to evaluate the sub-atmospheric moisture removal performance of three representative gas purifier technologies including Purifier C (composition scheme 2, Example 2, as described herein) under different test scenarios. A brief schematic of the test setup used is shown in FIG. 2. Sub-atmospheric pressure was maintained at purifier outlet and CRDS outlet using dry scroll vacuum pumps. Pressure was monitored at purifier outlet using Baratron® absolute capacitance manometer (MKS Instruments). Purifier outgassing levels under switch of gas supply state from nitrogen to hydrogen under 100-700 torr pressure range was measured. Purifier outlet moisture levels were measured under both $N_2$ and $H_2$ gas flow; both the nitrogen feed gas and hydrogen feed gas inlet to the test setup contained about 1 $ppb_{v/v}$ to 10 $ppb_{v/v}$ $O_2$ and 1 $ppb_{v/v}$ to 20 $ppb_{v/v}$ moisture. Furthermore, Purifier C (composition Scheme 2, Example 2, as described herein) was evaluated under a high moisture inlet challenge to examine the removal efficiency at low pressures in hydrogen gas. Test scenarios were chosen to mimic process states encountered in EUVL mini-environment optics cleaning and vacuum chamber purging and venting reported in the literature. Purifiers installation, conditioning and removal efficiency test were kept close to manufacturer instructions and semi test standards (SEMI F68-1101 *Test Method for Determining Purifier Efficiency* incorporated herein by reference in its entirety), respectively. Off resonance $H_2O$ cavity ringdown measurements were conducted under purifier test operating conditions in both hydrogen and nitrogen gas to extract the instrument LDL. Instrument sensitivity response was factory calibrated using NIST traced moisture reference standards.

$N_2$—$H_2$ Gas Flow Switch. A comparison of gas purifier moisture removal performance at reduced pressure is shown in FIG. 3. Purifiers are labeled as A, B and C. Purifier C is the purifier of Scheme 2 in Example 2 (see, for example, FIG. 6). A sequence of gas flow switches from $N_2$ gas to $H_2$ gas was applied to the purifier in order to mimic gas cycle conditions in EUVL. Both gas pressure and flow are kept constant during the gas switch. An $H_2$ induced moisture release is clearly observed to carry over to process downstream, in this instance the CRDS cavity cell is under sub-atmospheric pressure. Outgassing levels of greater than 10 ppb are observed during $H_2$ switch for purifiers A and B in FIG. 3.

FIG. 3 shows a comparison of moisture outgassing under sub-atmospheric conditions for three purifier technologies, A (comparative purifier that is a commercial product used for nitrogen and hydrogen purification to remove oxygen and moisture), B (comparative example that is an "H" purifier, available from Entegris, Inc., Bedford, Mass. and contains a metal catalyst to remove oxygen that can be reduced in hydrogen, and also contains a desiccant to remove moisture), and C (purifier of Scheme 2 as described in Example 2 below that includes a metal catalyst on a support and a molecular sieve desiccant); see text for details and Table 1 for purifier pressure.

As is seen from the outgassing temporal profiles in FIG. 3, especially with respect to purifier A, considerable downtime can be introduced in a gas distribution system or scanner in re-establishing stable $H_2O$ levels. Furthermore, these levels are nearly two times higher than levels in $N_2$ gas, see Table 1. In contrast, purifier C maintains near constant $H_2O$ levels on gas switch, mitigating any $H_2$-induced moisture outgassing, if any. In all cases except purifier C (purifier of scheme 2 in Example 2), the switch to $H_2$ gas flow from nitrogen gas causes moisture release above 5 parts per billion in the process stream.

TABLE 1

Purifier outlet moisture in ppb under $N_2$ and $H_2$ gas flow and sub-atmospheric pressure

| Purifier | $H_2O$(ppb) Gas | | Pressure (torr) |
|---|---|---|---|
| | $N_2$ | $H_2$ | |
| A | 10 | 22 | 240 |
| B (H) | 6 | 12 | 200 |
| C | 2 | <1 (LDL) | 100 |

Figure 4:
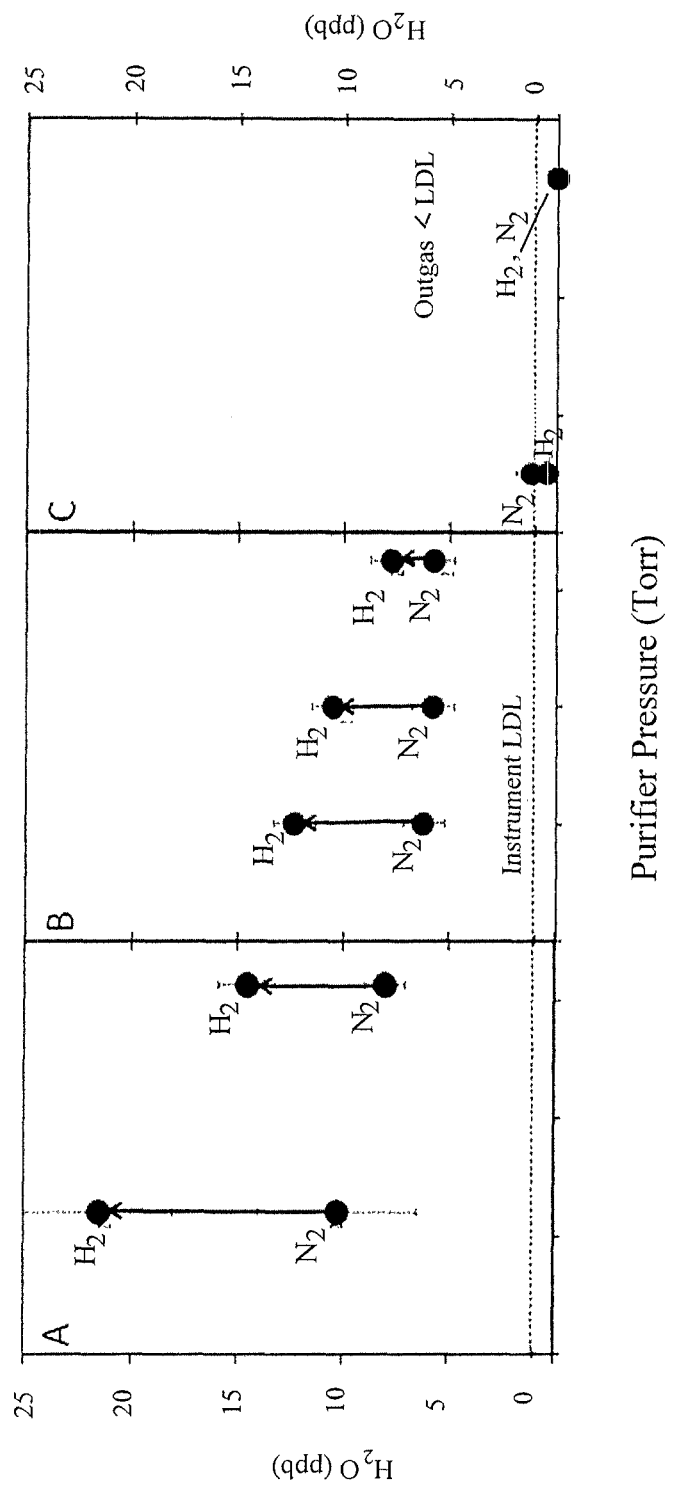
FIG. 4 is a graph of moisture level as a function of time, and shows the pressure dependence of moisture outgassing levels for three representative purifiers (A, B and C) under $N_2$ to $H_2$ gas flow switch (instrument lower detection limit (LDL)=1 ppb).

An examination of $H_2$ induced outgassing, was also conducted under varying pressure values in the 100-600 torr range. For both Purifier A and Purifier B, the moisture outgassing level is seen to increase at lower pressures, as shown in FIG. 4. At the lowest pressure probed, $H_2$ outgassing levels cause a two-fold increase in $H_2O$ levels for Purifier A and Purifier B. The absolute average levels reach near 20 $ppb_{v/v}$ and 10 $ppb_{v/v}$ under $H_2$ flow, respectively. In contrast Purifier C maintains below less than 1 $ppb_{v/v}$ levels at the lowest pressure probed under $H_2$ flow. At the higher pressure end, outgassing excursions decrease and higher moisture purity levels are reached. Flow switch from $N_2$ to $H_2$ results in half the outgassing for both purifiers A and B at 600 torr compared to 200 torr. Purifier C provides moisture outgas control under $N_2$ to $H_2$ flow switch, as shown in FIG. 4 at 100 and 600 torr; the moisture outgas at 200 torr (not performed) would be expected to be the same or better than the 100 torr pressure result for Purifier C.

Without wishing to be bound by theory, it is believed that oxygen is removed by a metal catalyst from nitrogen gas during purification. For example, nickel on a high surface area support can react with oxygen resulting in the formation of a nickel oxide through chemisorption. On switching to a reducing gas like hydrogen at room temperature, some, or all of the nickel oxide is reduced to nickel metal and water. This water can be released from Purifiers A and B at high levels (greater than 5 $ppb_{v/v}$ under the test conditions), because it is believed that these purifiers do not have sufficient capacity or kinetics to capture this released moisture under sub-atmospheric conditions. In contrast, purifier C has proportions of oxygen removing catalyst (composition comprising nickel on a high surface area support) and downstream water removing molecular sieve or zeolite with fast kinetics (mass transfer) and binding capability (thermodynamic-higher adsorption equilibrium value) that captures and effectively reduces the water generated from the hydrogen gas under the test conditions.

FIG. 4 shows pressure dependence of moisture outgassing levels for three representative purifiers under $N_2$ to $H_2$ gas flow switch. Purifier C, a version of the invention as described in Scheme 2 of Example 2, has outlet moisture levels that are maintained below instrument LDL (lower detection limit 1 ppb) in the 100-600 torr pressure range on switching from nitrogen to hydrogen gas.

Figure 5A:
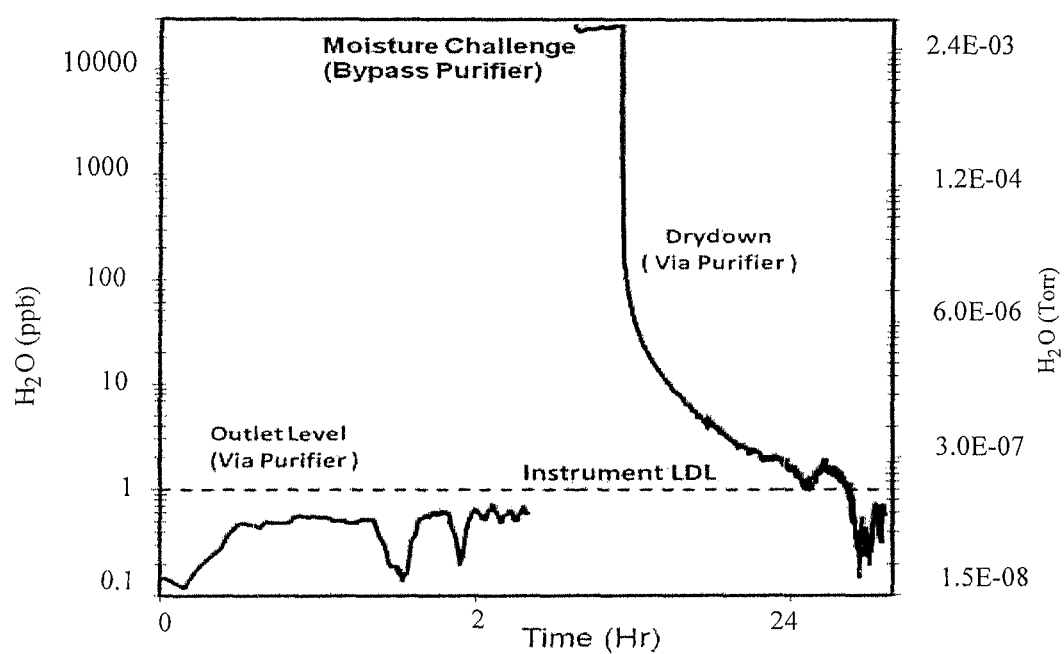
FIGS. 5A and 5B are graphs of moisture levels as a function of time, and show the outlet moisture of purifier C (composition Scheme 2, Example 2, as described herein) under wet (25 ppm) inlet moisture challenge in $H_2$ gas (FIG. 5A), and dry (less than 50 ppb) inlet moisture during $N_2$—$H_2$ flow switches (FIG. 5B).

Performance of Purifier C was further tested in $H_2$ gas by subjecting it to a high moisture level at the inlet, as shown in FIG. 5A. Purifier C outlet was observed to be below instrument LDL. Gas flow was bypassed to measure the moisture inlet levels. Moisture challenge of 25 ppm is seen to be removed to below 1 ppb at a pressure of 150 torr.

Subsequent switch back to purifier line allows a measurement of the drydown response. Levels of moisture less that 1 part per billion (<1 ppb) were established in 8 hours. Actual drydown time is dependent on purifier downstream tubing.

Figure 5B:
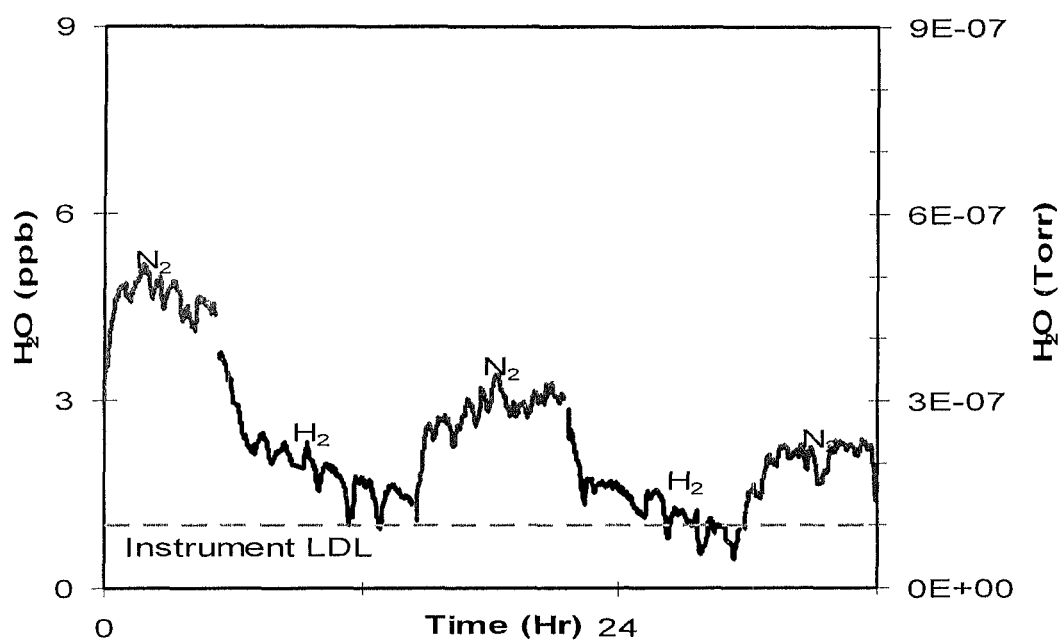

FIG. 5B also provides the response pattern for purifier C to $N_2$—$H_2$ flow switch at 100 torr for a relatively dry upstream gas stream (<50 ppb moisture feed). Below LDL levels are established downstream of Purifier C for both dry and wet upstream gas. A measure of the partial pressure of $H_2O$ under the test conditions is also provided in FIG. 5B. Values of <1E-07 torr are established under both dry and wet $N_2$ (data not shown) and $H_2$ gas flow.

An attempt was made to estimate the effects on optics reflectance based on purifier outlet moisture levels observed under our test conditions with those known to degrade lifetime of optics under EUV vacuum conditions. Wedowski et al. (Proc. SPIE 3767, 217 (Nov. 23, 1999), incorporated herein by reference in its entirety), observed near 12% loss in reflectivity upon EUV exposure of Mo/Si optics in presence of 1E-06 torr water vapor in vacuum chamber. Post exposure Auger sputter studies were used to identify oxidation of top Si layer as the source of irreversible optic reflectance loss.

Matsunari et al. report a logarithmic degradation of Ru and Si layers in Ru-capped Ru/Si optics reflectance (Matsunari et al., International Symposium on Extreme Ultraviolet Lithography EUVL Symposium 2005; incorporated herein by reference in its entirety) in the 1E-06(7.5E-09) to 1E-03(7.5E-06) Pa(torr) $H_2O$ partial pressure range. Based on reflectance and XPS correlation data, it is posited that EUV assisted oxidation of $H_2O$ promotes loss of optic surface reflectance (Kakutani, Y., et al., Jpn. J. Appl. Phys. 46 (2007) pp. 6155-6160 incorporated herein by reference in its entirety).

Purifier C (composition scheme 2, Example 2, as described herein) is shown to limit the partial pressure of moisture to less than 1E-07 torr in 100 torr $H_2$ gas. In contrast, Purifiers A and B are 10 to 50 times less efficient and drydown moisture to a partial pressure of only 1-5E-06 torr $H_2O$ at 200 torr total $H_2$ gas pressure. On a relative level, the moisture load introduced via gas distribution box into the ME will be reduced with Purifier C.

The above comparisons of moisture removal data across three representative $H_2$ purifier technologies demonstrate distinct advantages of Purifier C (composition scheme 2, Example 2, as described herein) under sub-atmospheric conditions. A probe of material properties were conducted (data not shown) to develop less than 1 ppb moisture removal performing gas purifier for EUVL application. Overall, reduced moisture outgassing under vacuum and gas switch as well as faster drydown is observed.

Example 2

Scheme 1 composition in one version of the invention is a bed of 33 milliliters (ml) of Ni on a high surface area support upstream, and a bed of 33 ml 13× zeolite molecular sieve downstream that has an approximately 2.2 mm bead (8×12 mesh bead)). Each bed volume is about 50% of the total purifier volume; the bed materials are contained in a housing with an inlet and an outlet.

Purifier media efficiency tests were performed in $N_2$ gas containing a part per million by volume challenge of moisture; the removal of $H_2O$ from the nitrogen gas was measured using APIMS.

Scheme 2 composition in another version of the invention is a bed of 33 ml of Ni on a high surface area support upstream, and a bed of 33 ml of 13× zeolite molecular sieve downstream having an approximately 0.7 millimeter bead size (20×50 mesh). Each bed volume is about 50% of the total purifier volume; the bed materials are contained in a housing with an inlet and an outlet.

A comparison of the Scheme 1 and Scheme 2 compositions are provided in Table 2. Better $H_2O$ capacity is observed with smaller (0.7 mm) 13× molecular sieve of Scheme 2 composition as evidenced by the later breakthrough time in FIG. 6. The breakthrough curve is sharper for the Scheme 2 composition, and the Scheme 2 composition has a higher moisture removal efficiency: Scheme 2 composition removal efficiency for a 12 ppm v/v moisture challenge in nitrogen at a flow rate of 10 slpm is 10 parts per trillion moisture by volume to 30 parts per trillion moisture by volume, as shown by the results for the Scheme 2 composition near 11000 minutes in FIG. 6. The observed removal was about 80 to 100 parts per trillion by volume moisture under the same test conditions, as shown by the results for the Scheme 1 composition in FIG. 6.

As can be seen in FIG. 6, the breakthrough curve for purifier Scheme 2 is sharpest. A sharper mass transfer zone provides a larger working capacity as well as a faster approach to lower concentration levels, about 20 parts per trillion for purifier Scheme 2 compared to about 80 parts per trillion for purifier Scheme 1. Purifier Scheme 2 leads to more stable purifier outlet moisture distribution as shown in FIG. 6 and further illustrated in FIG. 8. The presence of a fast adsorbent (larger $D_{eff}/R^2$ due to smaller sieve bead size) allows for a larger moisture intrapellet diffusion and approaches equilibrium conditions earlier.

TABLE 2

Comparison of Scheme 1 composition and Scheme 2 composition.

|  | Scheme 1 composition (Ni and 13X[8 × 12 mesh]) | Scheme 2 composition (Ni and 13X[20 × 50 mesh]) |
|---|---|---|
| Flow (SLPM) | 10 | 10 |
| Challenge (ppmv moisture in N2) | 12 | 12 |
| Pressure (psig) inlet | 50-55 | 50-55 |

TABLE 2-continued

Comparison of Scheme 1 composition and Scheme 2 composition.

|  | Scheme 1 composition (Ni and 13X[8 × 12 mesh]) | Scheme 2 composition (Ni and 13X[20 × 50 mesh]) |
|---|---|---|
| Outlet (ppt$_{v/v}$) | 80 ppt$_{v/v}$ | 30 ppt$_{v/v}$ |
| Percent Removal | 99.9993 | 99.9998 |
| Purifier Configuration | Standard Entegris 70 KF (66 milliliters (ml) media, Body 1.5" Dia, 3.25" length) | Standard Entegris 70 KF (66 milliliters (ml) media, Body 1.5" Dia, 3.25" length) |
| Material (Two layers) | Nickel (inlet side) = 33 ml, 13X (outlet side) = 33 ml | Nickel (inlet side) = 33 ml, 13X (outlet side) = 33 ml |

Table 3 summarizes the Pressure inlet (Pin), the flow in standard liters per minute gas and the differential pressure for composition of scheme 1 in a 70 KF housing with fits, Entegris, Inc., and Table 3 also summarizes the differential pressure across the purifier for the composition of scheme 2 also in a 70 KF housing with fits (Entegris, Inc.). The delta pressure for the two samples are within about (±30%).

| Scheme 1 composition | | | Scheme 2 composition | | |
|---|---|---|---|---|---|
| Pin | Flow | delta P | Pin | Flow | delta P |
| 15 | 1 | 0.131984 | 15 | 1 | 0.11603 |
| 30 | 1 | 0.07687 | 30 | 1 | 0.073969 |
| 60 | 1 | 0.042061 | 60 | 1 | 0.034809 |
| 90 | 1 | 0.031908 | 90 | 1 | 0.020305 |
| 15 | 3 | 0.352442 | 15 | 3 | 0.339388 |
| 30 | 3 | 0.258167 | 30 | 3 | 0.236411 |
| 60 | 3 | 0.146488 | 60 | 3 | 0.134885 |
| 90 | 3 | 0.092824 | 90 | 3 | 0.089923 |
| 15 | 10 | 1.341599 | 15 | 10 | 1.325645 |
| 30 | 10 | 0.92389 | 30 | 10 | 0.880379 |
| 60 | 10 | 0.558395 | 60 | 10 | 0.507632 |
| 90 | 10 | 0.398854 | 90 | 10 | 0.34809 |

Purifier Size=Standard 70 KF Entegris Purifier Body

FIG. 6 illustrates the breakthrough curve of challenge moisture for the purifier (scheme 2 composition) with nickel metal on a high surface area support and 13× molecular sieves (0.7 millimeter bead size). The breakthrough curve is characterized by an increase in the outlet moisture concentration from a baseline of about 20 parts per trillion by volume to 100 parts per trillion by volume, a change of 5 times the average baseline outlet concentration of the purifier, in a time of from about 11.5×10³ minutes to 12.8×10³ minutes (about 1.3×10³ minutes or less); this purifier Scheme 2 exhibits a sharp breakthrough curve. The breakthrough curve with moisture for the purifier (Scheme 1 composition) with nickel metal on a high surface area support and 13× molecular sieves that have a 2.2 millimeter bead size is characterized by an increase in the outlet moisture concentration from a baseline of about 80 parts per trillion by volume up to a concentration of about 400 parts per trillion by volume, a change of about 5 times the average baseline outlet concentration of the purifier, in a time of from 4×10³ minutes to 7×10³ minutes (or about 3×10³ minutes); the Scheme 1 purifier has a less sharp breakthrough curve with moisture than the Scheme 2 purifier. This graph shows that both the Scheme 1 composition and the Scheme 2 purifier composition can achieve below 100 parts per trillion moisture at the purifier outlet after 4000 minutes (66.6 hours).

The percent removal of moisture from the challenge is 99.9993% for purifier of Scheme 1 and the percent removal of moisture from the challenge is 99.9998% for the composition of Scheme 2.

Figure 7:
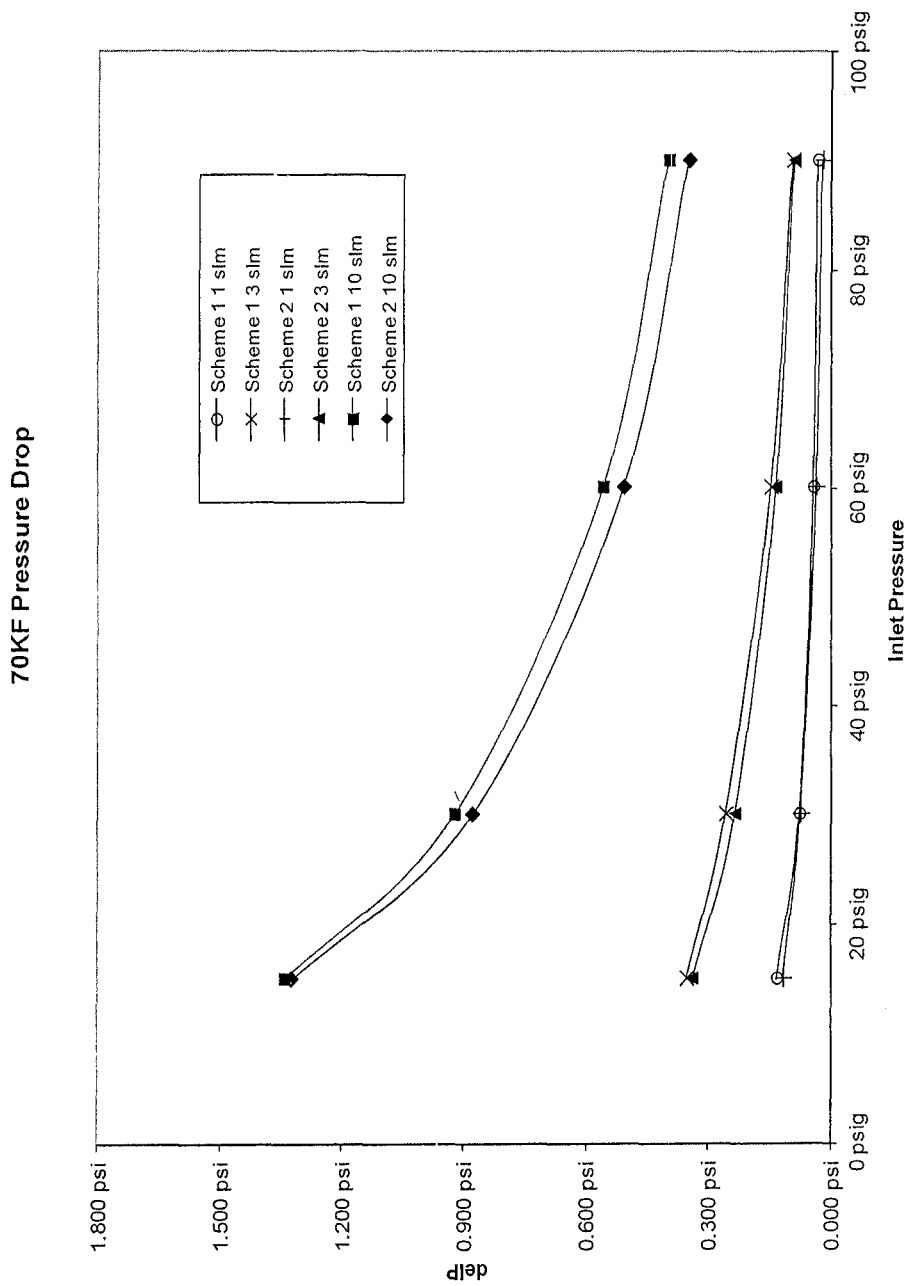
FIG. 7 is a graph of change in purifier pressure as a function of inlet pressure, and illustrates pressure drop curves for Scheme 1 and Scheme 2 purifier compositions at a variety of flow rates.

FIG. 7 illustrates pressure drop curves for Scheme 1 and Scheme 2 purifier compositions; differential pressure data are summarized in Table 3 above.

Figure 8:
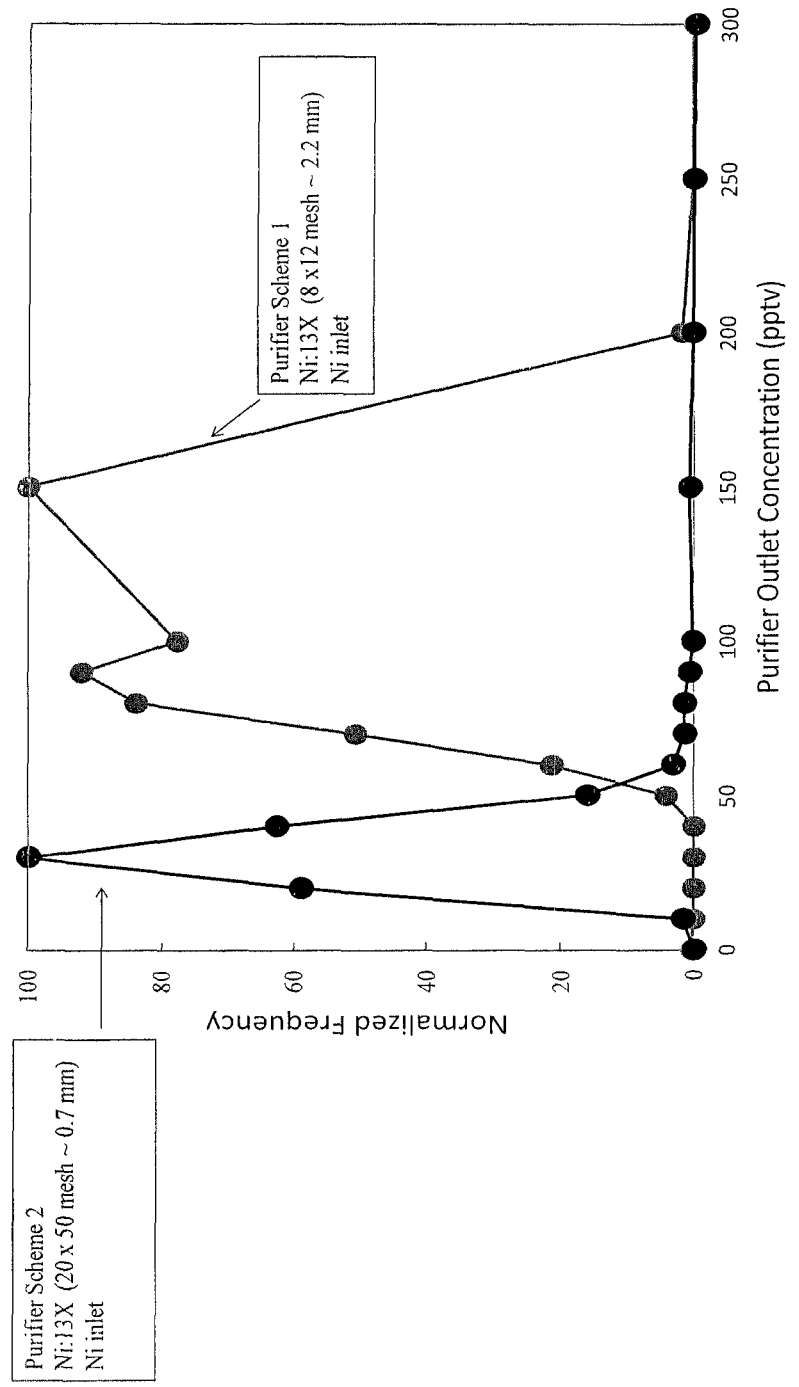
FIG. 8 is a graph of normalized frequency versus purifier outlet concentration for Scheme 1 and Scheme 2 purifiers, and illustrates the outlet moisture content for Scheme 1 and Scheme 2 compositions in standard 70KF-sized purifier housings, each under moisture challenge of 12 parts per million by volume (ppmv) at a gas flow rate of 10 SLPM.

FIG. 8 illustrates the outlet moisture content for Scheme 1 composition and Scheme 2 composition in standard 70KF sized purifier housings, each under moisture challenge of 12 parts per million by volume (ppmv) at 10 SLPM gas flow which is monitored for peak purity and stability. The peak distribution for Scheme 2 media is 30 parts per trillion by volume (pptv) with FWHM (full width half maximum) of 25 pptv. The Scheme 1 media has peak purity and stability, i.e., 80 pptv peak and 30 pptv FWHM.

Without wishing to be bound by theory, the efficiency in the equilibrium zone of a purifier bed is directly related to the equilibrium isotherms for the impurity gas being removed and the bulk gas being purified. These isotherms should be nearly identical for the two particle sizes of 13× zeolite in this example since the adsorbent and binders are similar in amount and chemical composition. The level of moisture is about 20 parts per trillion by volume to about 50 parts per trillion by volume (ppt$_{v/v}$) for gas passed through the smaller bead size (0.7 mm), and is about 100 ppt$_{v/v}$ for gas passed through the larger bead size (2.2 mm). Equilibrium isotherms for adsorption of carbon dioxide and nitrogen gases confirm that the equilibrium capacities of the two samples (2.2 mm and 0.7 mm beads) are the same, within the limits of experimental error. It is expected that the water adsorption capacities are also the same for the two samples (2.2 mm and 0.7 mm beads). The pressure drop for these two purifier bed configurations are substantially the same as illustrated by the data in Table 3 and FIG. 7. The difference in moisture removal efficiency (higher for Scheme 2) and purity stability (higher for Scheme 2) for the two purifiers is believed to be due to the difference in the particle size of the zeolite desiccant for the two compositions, where the mass transfer rate of contaminant into the molecular sieve adsorbent pellet increases inversely to the square of the pellet radius as described by ($D_{eff}/R^2$). It is demonstrated that the purity stability is not dominated by shot noise (both peak moisture level and fluctuation is lower for purifier for Scheme 2).

Example 3

One problem with purifiers that include multiple separate beds of materials or multiple separate layers of purification media, each layer removing a specific contaminant, is that there can be migration of material from one bed into an adjacent bed. Even when a partition, filter, or mesh screen is used, they can tilt during use or have passages at their edges that allow bed or particle migration from one layer to another. The migration of material from one layer to another can result in decreased purifier performance because the downstream purifier media may become partially coated with upstream purifier media and therefore have less contaminant removal capacity or stability.

This problem can be solved by using a purifier that includes at least an upstream purification media and a different downstream purification media, a gas permeable membrane that retains media particles and media fines or dust, that is between the upstream and the downstream media. The membrane firmly holds or retains the downstream media in place in the purifier housing with sufficient force to prevent channeling of the downstream media regardless of purifier housing orientation. The membrane is secured uniformly at its edges so that any gas with upstream media particles is forced to flow through the membrane where these media particles are retained.

Purification of hydrogen gas in with and without retaining ring.

It was previously assumed that in multilayer purifiers there was minimal layer migration and that migration of microparticles (micron and submicron sized particles from about 0.03 microns to 10 microns), fines, and dust of adjacent purification media layers did not occur or did not negatively impact purifier performance.

During an investigation, a number of purification devices were opened and examined. It was found that several purification devices used wire mesh material between the bed layers. A physical mechanism for securing the wire mesh material to the housing in these devices was not observed.

An experiment was performed to determine the effect of purification media particle (includes microparticles and millimeter sized media particles) migration on gas purifier performance.

The test gas was hydrogen (AirGas Industrial Grade) at a flow rate of 5 standard liters per minute and pressure of 30 pounds per square inch. The detection system was APIMS (atmospheric pressure ionization mass spectroscopy). The experiment was performed in a 70K sized Entegris purified body. The purifier was a two-layered packed bed, including one layer of Ni/NiO extrudate and a second layer of 13× molecular sieves downstream having an approximately 0.7 millimeter bead size (20×50 mesh). The porous membrane was stainless steel felt.

In this example, the membrane was a stainless steel cloth/felt that was cut to fit within the internal diameter of the purifier housing. This disk of membrane was placed on top of the first layer of the purification media in the housing for each of the test purifiers. The membrane had a nominal 0.1 micron pore size which, for the media used in this example, prevents the media from an adjacent bed from coating the downstream layer.

Figure 9:
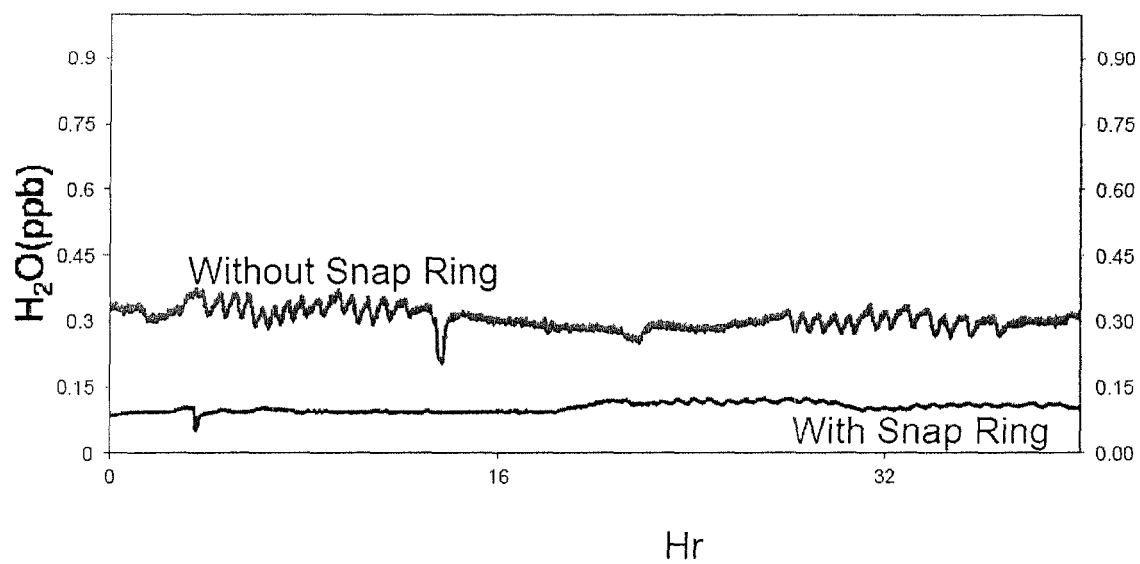
FIG. 9 shows the moisture concentration in parts per billion by volume in hydrogen gas after treatment with a purification device as a function of time in hours.

For one test purifier the upstream media was loaded directly onto the felt membrane—this purifier is designated as "Without Snap Ring" in FIG. 9. The housing was completed as illustrated in FIG. 11 using an upstream frit 301.

In the other test purifier, a retaining ring was used to secure the felt membrane firmly against the downstream media and housing. Upstream media was then loaded onto this assembly and the housing completed as illustrated in FIG. 11 using an upstream frit 301.

The moisture concentrations in the graph were from two test purifiers challenged with hydrogen gas under similar test conditions; each purifier had the same purifier media layers with the same felt membrane (nominal 0.1 micron pore size) between layers of purifier media. In one case, the purifier was without a retaining ring to hold the membrane in place (top trace, FIG. 9), and in the other case, the test purifier used a retaining ring to hold the membrane in place (bottom trace, FIG. 9).

The top trace of FIG. 9 illustrates that for the same purifier media layers over the 32 hours of the test, the moisture concentration in hydrogen outlet from the purifier was lower (0.098 $ppb_{v/v}$) and had lower standard deviation (0.015 $ppb_{v/v}$) with the retaining ring to secure the edges of the membrane against the housing and downstream media when compared to the moisture concentration in hydrogen outlet from the purifier without the retaining ring which was (0.315 $ppb_{v/v}$) with a standard deviation (0.098 $ppb_{v/v}$). Prevention of extrudate migration with a retaining ring correlated with improved moisture removal performance of the gas filtration device.

Implementing a retaining ring prevents migration of purification media between layers.

Figure 10:
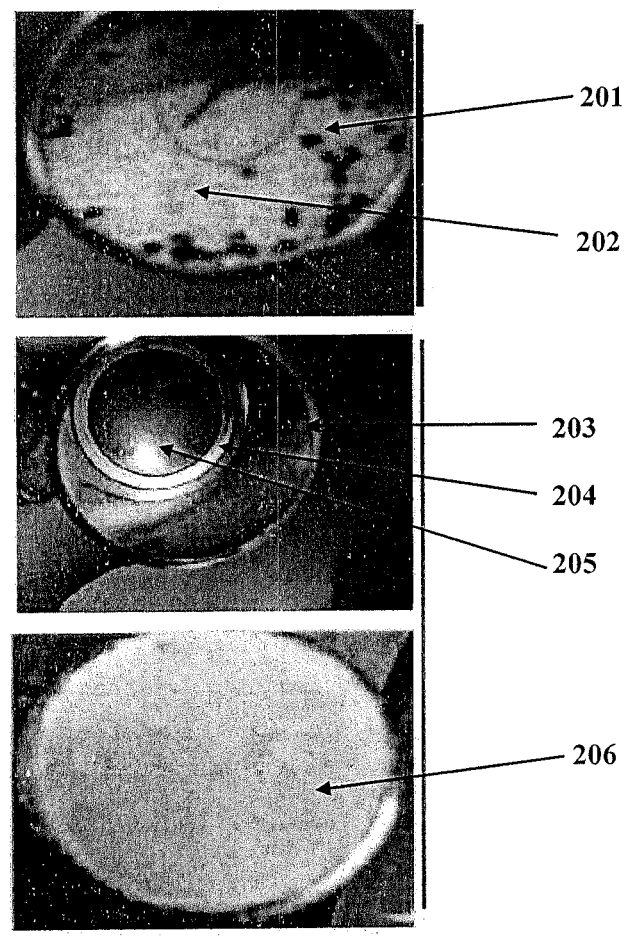
FIG. 10 shows a series of images of a gas purifier, used with or without an expandable media-retaining ring, or snap ring, to fix and retain the membrane. The top image is from a used gas purifier without a snap ring, and shows a downstream media layer with deposits of particles from the upstream media layer. The center image shows the gas purifier with an expandable media-retaining ring and membrane retained in the housing. The bottom image is from a used gas purifier equipped with an expandable ring, and shows a downstream media layer that does not exhibit any deposits of particles from the upstream layer.

Migration of nickel extrudate during purifier assembly, activation, and usage can result in a loss in moisture impurity at the purifier outlet during its operation in $H_2$ gas. In the top image of FIG. 10, a membrane filter was placed between two separation media layers without a retaining ring. This solution was inadequate to prevent Ni migration, as shown. The top image of FIG. 10 shows downstream media just below felt screen membrane in a purifier that was used without retaining ring in place. There are small black particles 201 of the upstream media that are clearly visible around the edges of the sample and the downstream media 202 has a discolored appearance indicative of the darker fines of upstream media coating the downstream media. Without a retaining ring, the membrane is ineffective due to its ability to tilt during operation. A retaining ring 204 was inserted into the housing 203 on top of the membrane 205, as shown in the center. The implementation of the retaining ring proved to be effective in preventing media particle migration, as shown in the bottom image of FIG. 10, which shows the downstream media 206 just below felt screen in a purifier after use with a retaining ring in place. There were no small black particles of the upstream media or discoloration of the downstream media. The downstream media retained its white appearance and showed that by securing the felt screen membrane at its edges, upstream media migration was prevented.

This example shows that by securing a felt membrane between media layers, where an entire surface of the membrane is in firm contact with the downstream media and the membrane is in a fixed relationship with the housing, that the secured membrane was able to significantly or completely eliminate migration of the upstream media into the downstream media as shown in FIG. 10 and the purifier was able to reach much lower levels of purification and stability as shown in the FIG. 9.

Although the present invention has been described in considerable detail with reference to certain embodiments thereof, other versions are possible. Therefore the spirit and scope of the appended claims should not be limited to the description and the versions contained within this specification.

The teachings of all patents, published applications and references cited herein are incorporated by reference in their entirety.

What is claimed is:

1. A gas purifier, comprising:
   a housing having a fluid inlet and a fluid outlet, the inlet and outlet fluidly connected through a purifier bed contained in the housing that removes moisture and oxygen from an inert gas and from a reducing gas, the purifier bed comprising:
   a first bed of material comprising macropore mass transfer limited molecular sieves that remove moisture from the inert gas and the reducing gas, the molecular sieves having a particle size of 0.7 millimeters±20 percent; and
   a second bed of material comprising a metal catalyst on a support that removes oxygen from the inert gas and the reducing gas, the metal catalyst being at least partially regenerated to a reduced form by the reducing gas at room temperature.

2. The gas purifier of claim 1, wherein the gas purifier is characterized by a moisture concentration at the fluid outlet of 5 parts per billion by volume (ppbv/v) or less in a hydrogen gas flow of 2 standard liters per minutes (slpm) at a pressure of 200 torr after flowing nitrogen gas containing between 1 ppbv/v and 20 ppbv/v oxygen and between 1 ppbv/v and 20 ppbv/v moisture at a pressure of 200 torr and a gas flow of 2 slpm for 6 hours through the gas purifier.

3. The gas purifier of claim 1, wherein the molecular sieves are alkali metal zeolite X molecular sieves.

4. The gas purifier of claim 3, wherein the alkali metal zeolite X molecular sieves are 13× molecular sieves.

5. The gas purifier of claim 3, wherein the alkali metal zeolite X molecular sieves are 13× molecular sieves that have a particle size of 0.7 millimeters±20 percent.

6. The gas purifier of claim 1, wherein the first bed of material is 30 percent by volume to 70 percent by volume of the purifier bed, and the second bed of material is 70 percent by volume to 30 percent by volume of the purifier bed.

7. The gas purifier of claim 6, wherein the first bed of material is 50±5 percent by volume of the purifier bed, and the second bed of material is 50±5 percent by volume of the purifier bed.

8. The gas purifier of claim 6, wherein the first bed of material is 30 percent by volume to 40 percent by volume of the purifier bed, and the second bed of material is 70 percent by volume to 60 percent by volume of the purifier bed.

9. The purifier of claim 1, further characterized by a moisture concentration at the fluid outlet of 100 parts per trillion by volume or less after 4000 minutes, after flowing an inert gas containing 12 parts per million moisture by volume at a flow rate of 10 standard liters per minute through the purifier.

10. The purifier of claim 1, wherein the metal catalyst contains nickel.

11. The purifier of claim 1, wherein the first bed of material is downstream of the second bed of material.

12. The purifier of claim 1, wherein the purifier bed removes moisture and oxygen from the inert gas and the reducing gas at sub-atmospheric pressure.

13. The purifier of claim 1, wherein the purifier bed removes moisture and oxygen from the inert gas and the reducing gas at atmospheric pressure.

14. The gas purifier of claim 1, wherein the gas purifier further comprises a media-retaining porous membrane separating the first bed of material and the second bed of material, wherein the media-retaining porous membrane is secured within the housing at its edges by an expandable ring comprising an inner circumference, an outer circumference and a locking mechanism for expanding and retaining the ring by radial force against an inner wall of the housing when the locking mechanism is engaged.

15. The gas purifier of claim 14, wherein the media-retaining porous membrane is a gas-permeable membrane having a pore size to prevent media of the first bed of material and the second bed of material from passing therethrough.

16. The gas purifier of claim 14, wherein the media-retaining porous membrane is in intimate and retaining contact with the first bed of material.

17. The gas purifier of claim 14, wherein the media-retaining porous membrane is fixed between a surface of the expandable ring and a surface of the second bed of material, wherein the second bed of material is located downstream of the first bed of material.

18. The gas purifier of claim 14, wherein the locking mechanism is spring-locking mechanism.

19. The gas purifier of claim 14, wherein the expandable ring is secured by radial force between the outer diameter of the expandable ring and the inner wall of the housing.

20. The gas purifier of claim 1, further comprising one or more additional beds of material and optionally one or more media-retaining porous membranes, wherein the membrane, if present, separates any two beds of material.

* * * * *